United States Patent
Qin et al.

(10) Patent No.: US 10,171,729 B2
(45) Date of Patent: Jan. 1, 2019

(54) DIRECTIONAL ADJUSTMENT FOR A CAMERA BASED ON EXPOSURE QUALITY INFORMATION

(71) Applicant: Huawei Technologies Co., Ltd., Shenzhen (CN)

(72) Inventors: Chao Qin, Beijing (CN); Peng Wang, Beijing (CN); Wenmei Gao, Beijing (CN); Yahui Wang, Beijing (CN); Hao Jing, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/553,898

(22) PCT Filed: Feb. 28, 2015

(86) PCT No.: PCT/CN2015/073392
§ 371 (c)(1),
(2) Date: Aug. 25, 2017

(87) PCT Pub. No.: WO2016/134534
PCT Pub. Date: Sep. 1, 2016

(65) Prior Publication Data
US 2018/0041692 A1 Feb. 8, 2018

(51) Int. Cl.
*H04N 5/232* (2006.01)
*H04M 1/02* (2006.01)

(52) U.S. Cl.
CPC ...... *H04N 5/23216* (2013.01); *H04M 1/0264* (2013.01); *H04N 5/23222* (2013.01);
(Continued)

(58) Field of Classification Search
CPC .......... H04N 5/23222; H04N 5/23293; H04N 5/23216; H04N 5/23219; H04N 5/23254; H04N 2250/20
See application file for complete search history.

(56) References Cited

U.S. PATENT DOCUMENTS

| | | | |
|---|---|---|---|
| 6,930,703 B1 * | 8/2005 | Hubel | G03B 37/04 348/208.16 |
| 8,264,559 B2 * | 9/2012 | Shioya | H04N 5/232 348/208.16 |

(Continued)

FOREIGN PATENT DOCUMENTS

| | | |
|---|---|---|
| CN | 102420898 A | 4/2012 |
| CN | 103795922 A | 5/2014 |

(Continued)

OTHER PUBLICATIONS

Machine Translation and Abstract of Chinese Publication No. CN102420898, Apr. 18, 2012, 18 pages.
(Continued)

*Primary Examiner* — Twyler Haskins
*Assistant Examiner* — Akshay Trehan
(74) *Attorney, Agent, or Firm* — Conley Rose, P.C.

(57) ABSTRACT

An automatic camera adjustment method and an electronic device, where the method is applied to an electronic device with a rotatable camera. The electronic device obtains a parameter of a preview image in a shot of the camera, determines a parameter for rotating of the camera according to the parameter of the preview image, and adjusts an azimuth of the camera according to the parameter for rotating of the camera. Quality of a photographed image may be improved by adjusting the camera.

20 Claims, 10 Drawing Sheets

(52) U.S. Cl.
CPC ..... *H04N 5/23254* (2013.01); *H04N 5/23258* (2013.01); *H04N 5/23287* (2013.01); *H04N 5/23293* (2013.01); *H04M 2250/20* (2013.01); *H04M 2250/52* (2013.01)

(56) References Cited

U.S. PATENT DOCUMENTS

| | | | | |
|---|---|---|---|---|
| 9,288,471 | B1* | 3/2016 | Yang | H04N 13/0221 |
| 2007/0279481 | A1* | 12/2007 | Chambers | H04N 5/232 348/14.01 |
| 2009/0128647 | A1* | 5/2009 | Fahn | G01S 3/7865 348/221.1 |
| 2010/0207774 | A1* | 8/2010 | Song | H04N 5/2257 340/669 |
| 2012/0293683 | A1* | 11/2012 | Osaka | G06F 1/1686 348/222.1 |
| 2013/0155280 | A1 | 6/2013 | Donatelli et al. | |
| 2015/0189175 | A1* | 7/2015 | Fan | H04N 5/2251 348/37 |

FOREIGN PATENT DOCUMENTS

| | | |
|---|---|---|
| CN | 104052928 A | 9/2014 |
| CN | 104113697 A | 10/2014 |

OTHER PUBLICATIONS

Machine Translation and Abstract of Chinese Publication No. CN103795922, May 14, 2014, 9 pages.

Machine Translation and Abstract of Chinese Publication No. CN104052928, Sep. 17, 2014, 13 pages.

Machine Translation and Abstract of Chinese Publication No. CN104113697, Oct. 22, 2014, 41 pages.

Foreign Communication From a Counterpart Application, PCT Application PCT/CN2015/073392, English Translation of International Search Report dated Nov. 20, 2015, 2 pages.

Foreign Communication From a Counterpart Application, PCT Application PCT/CN2015/073392, English Translation of Written Opinion dated Nov. 20, 2015, 6 pages.

* cited by examiner

Front view of a mobile phone    Side view of the mobile phone

DIRECTIONAL ADJUSTMENT FOR A CAMERA BASED ON EXPOSURE QUALITY INFORMATION

CROSS-REFERENCE TO RELATED APPLICATION

This application is a U.S. National Stage of International Patent Application No. PCT/CN2015/073392 filed on Feb. 28, 2015, which is hereby incorporated by reference in its entirety.

TECHNICAL FIELD

Embodiments of the present disclosure relate to the field of electronic products, and in particular, to an automatic camera adjustment method and an electronic device.

BACKGROUND

As a function of a camera of a mobile phone improves, more users choose to use the camera of the mobile phone to photograph a scenery. Generally, the camera of the mobile phone is fastened on the mobile phone, and there is a front-facing camera and a rear-facing camera. One side of the mobile phone faces a photographed object during photographing.

In recent years, there appear some mobile phones with rotatable cameras. A rotatable camera can provide an automatic panoramic photo shooting function, that is, the camera automatically rotates and takes photos, and then perform synthesis. In this way, a user no longer needs to rotate the body or a hand. However, at present, a mobile phone with a rotatable camera has no other special function in addition to the automatic panoramic photo shooting function.

SUMMARY

Embodiments of the present disclosure provide an automatic camera adjustment method and an electronic device, which can improve quality of an image photographed by a camera.

A first aspect of the present disclosure provides an automatic camera adjustment method, where the method is applied to an electronic device with a rotatable camera, and the method includes obtaining a parameter of a preview image in a shot of the camera, where the parameter of the preview image is any one of location information of a subject of the preview image, exposure quality information of the preview image, or image composition information of the preview image, determining a parameter for rotating of the camera according to the parameter of the preview image, where the parameter for rotating of the camera includes a direction for rotating of the camera, and adjusting the camera according to the parameter for rotating of the camera.

With reference to the first aspect of the present disclosure, in a first possible implementation manner of the first aspect of the present disclosure, when the parameter of the preview image is location information of the preview image, obtaining a parameter of a preview image in a shot of the camera includes obtaining first location information of an initial location of the subject of the preview image, and after the electronic device rotates, obtaining second location information of a location obtained after the subject of the preview image rotates, determining a parameter for rotating of the camera according to the parameter of the preview image includes determining an offset direction of the preview image according to the first location information and the second location information, where the offset direction of the preview image is the direction for rotating of the camera, and adjusting the camera according to the parameter for rotating of the camera includes rotating the camera according to the direction for rotating of the camera, until the subject of the preview image returns to the initial location, and then stop rotating the camera.

With reference to the first possible implementation manner of the first aspect of the present disclosure, in a second possible implementation manner of the first aspect of the present disclosure, after obtaining first location information of an initial location of the preview image, the method further includes detecting whether the electronic device moves, and obtaining the second location information of the location obtained after the preview image rotates if it is detected that the electronic device moves.

With reference to the first aspect of the present disclosure, in a third possible implementation manner of the first aspect of the present disclosure, when the parameter of the preview image is location information of the preview image, the parameter for rotating of the camera further includes an angle for rotating of the camera, obtaining a parameter of a preview image in a shot of the camera includes obtaining initial location information of an initial location of the subject of the preview image, determining a parameter for rotating of the camera according to the parameter of the preview image includes determining a rotation direction and a rotation angle that are of the electronic device after the electronic device rotates, and determining the angle for rotating and the direction for rotating of the camera according to the rotation direction and the rotation angle that are of the electronic device, where the angle for rotating of the camera is the same as the rotation angle of the electronic device, and the direction for rotating of the camera is opposite to the rotation direction of the electronic device, and adjusting the camera according to the parameter for rotating of the camera includes rotating the camera according to the angle for rotating and the direction for rotating of the camera, until the subject of the preview image returns to the initial location.

With reference to the first aspect of the present disclosure, in a fourth possible implementation manner of the first aspect of the present disclosure, when the parameter of the preview image is the exposure quality information of the preview image of the camera, obtaining a parameter of a preview image in a shot of the camera includes obtaining brightness distribution information of the preview image, and obtaining the exposure quality information of the preview image according to the brightness distribution information of the preview image, where the exposure quality information of the preview image includes overexposure, normal exposure, or underexposure, determining a parameter for rotating of the camera according to the parameter of the preview image includes determining, according to the exposure quality information of the preview image, whether the camera needs to be rotated, dividing the preview image of the camera into N sub-images in a direction parallel to a rotation axis of the camera if the camera needs to be rotated, where N is greater than or equal to 2, and obtaining brightness distribution information of the N sub-images, and determining the direction for rotating of the camera by comparing each piece of the brightness distribution information of the N sub-images with the brightness distribution information of the preview image, and adjusting the camera according to the parameter for rotating of the camera includes rotating the camera according to the direction for rotating of the camera, until exposure quality of the preview image meets a preset condition, and then stop rotating the camera.

With reference to the fourth possible implementation manner of the first aspect of the present disclosure, in a fifth possible implementation manner of the first aspect of the present disclosure, determining the direction for rotating of the camera by comparing each piece of the brightness distribution information of the N sub-images with the brightness distribution information of the preview image includes comparing the brightness distribution information of the preview image with each piece of brightness distribution information of a first sub-image and a last sub-image that are in the N sub-images to determine a sub-image that affects the exposure quality of the preview image, where the first sub-image and the last sub-image are two sub-images that are of the preview image and that are respectively located at two ends, and determining that the direction for rotating of the camera is a direction in which the first sub-image is shifted out of the shot of the camera if the first sub-image is the sub-image that affects the exposure quality of the preview image, or determining that the direction for rotating of the camera is a direction in which the last sub-image is shifted out of the shot of the camera if the last sub-image is the sub-image that affects the exposure quality of the preview image.

With reference to the fourth or the fifth possible implementation manner of the first aspect of the present disclosure, in a sixth possible implementation manner of the first aspect of the present disclosure, rotating the camera according to the direction for rotating of the camera, until exposure quality of the preview image meets a condition, and then stop rotating the camera includes rotating the camera according to the direction for rotating of the camera, and obtaining the brightness distribution information of the preview image in a rotation process, determining, according to the brightness distribution information of the preview image, whether the exposure quality of the preview image meets the preset condition, and if the exposure quality of the preview image meets the preset condition, stop rotating the camera, or continue rotating the camera according to the direction for rotating of the camera if the exposure quality of the preview image does not meet the preset condition, until the exposure quality of the preview image meets the preset condition, and then stop rotating the camera.

With reference to the sixth possible implementation manner of the first aspect of the present disclosure, in a seventh possible implementation manner of the first aspect of the present disclosure, determining, according to the brightness distribution information of the preview image, whether the exposure quality of the preview image meets the preset condition includes obtaining the exposure quality information of the preview image and a brightness distribution variance of the preview image according to the brightness distribution information of the preview image, and determining that the exposure quality of the preview image meets the preset condition if the exposure quality information of the preview image is the normal exposure, or determining that the exposure quality of the preview image meets the preset condition if the exposure quality information of the preview image is the underexposure or the overexposure, but the brightness distribution variance of the preview image is less than a preset brightness distribution variance threshold.

With reference to the first aspect of the present disclosure, in an eighth possible implementation manner of the first aspect of the present disclosure, when the parameter of the preview image is the image composition information of the preview image of the camera, obtaining a parameter of a preview image in a shot of the camera includes determining image composition of the subject of the preview image, determining a parameter for rotating of the camera according to the parameter of the preview image includes matching the image composition of the subject of the preview image with multiple prestored image composition templates, to determine target image composition that matches the image composition of the subject of the preview image, and determining the direction for rotating of the camera according to a location deviation between the image composition of the subject of the preview image and the target image composition, and adjusting the camera according to the parameter for rotating of the camera includes rotating the camera according to the direction for rotating of the camera, until image composition quality of the preview image meets a preset condition, and then stop rotating the camera.

With reference to the eighth possible implementation manner of the first aspect of the present disclosure, in a ninth possible implementation manner of the first aspect of the present disclosure, rotating the camera according to the direction for rotating of the camera, until image composition quality of the preview image meets a preset condition, and then stop rotating the camera includes rotating the camera according to the direction for rotating of the camera, obtaining the image composition of the subject of the preview image in a rotation process, and determining whether the location deviation between the image composition of the subject of the preview image and the target image composition is less than a preset deviation threshold, and stop rotating the camera if the location deviation between the image composition of the subject of the preview image and the target image composition is less than the deviation threshold, or if the location deviation between the image composition of the subject of the preview image and the target image composition is not less than the preset deviation threshold, continue adjusting the camera according to the adjustment direction, until the location deviation between the image composition of the subject of the preview image and the target image composition is less than the deviation threshold, and then stop rotating the camera.

With reference to the eighth or the ninth possible implementation manner of the first aspect of the present disclosure, in a tenth possible implementation manner of the first aspect of the present disclosure, determining image composition of the subject of the preview image includes obtaining the image composition of the subject of the preview image in at least one manner of horizontal/vertical projection, edge detection, shape analysis, or color analysis.

A second aspect of the present disclosure provides an electronic device, where the electronic device includes an obtaining module configured to obtain a parameter of a preview image in a shot of the camera, where the parameter of the preview image is any one of the following location information of a subject of the preview image, exposure quality information of the preview image, or image composition information of the preview image, a determining module configured to determine a parameter for rotating of the camera according to the parameter that is of the preview image and that is obtained by the obtaining module, where the parameter for rotating of the camera includes a direction for rotating of the camera, and an adjustment module configured to adjust the camera according to the parameter for rotating of the camera determined by the determining module.

With reference to the second aspect of the present disclosure, in a first possible implementation manner of the second aspect of the present disclosure, when the parameter of the preview image is location information of the preview image, the obtaining module is further configured to obtain first location information of an initial location of the subject of the preview image, and obtain second location information of a location obtained after the subject of the preview image rotates after the electronic device rotates. The determining module is further configured to determine an offset direction of the preview image according to the first location information and the second location information, where the offset direction of the preview image is the direction for rotating of the camera, and the adjustment module is further configured to rotate the camera according to the direction for rotating of the camera, until the subject of the preview image returns to the initial location, and then stop rotating the camera.

With reference to the first possible implementation manner of the second aspect of the present disclosure, in a second possible implementation manner of the second aspect of the present disclosure, the electronic device further includes a detecting module configured to detect whether the electronic device moves after the obtaining module obtains the first location information of the initial location of the preview image, and the obtaining module obtains the second location information of the location obtained after the preview image rotates if the detecting module detects that the electronic device moves.

With reference to the second aspect of the present disclosure, in a third possible implementation manner of the second aspect of the present disclosure, when the parameter of the preview image is location information of the preview image, the parameter for rotating of the camera further includes an angle for rotating of the camera. The obtaining module is further configured to obtain initial location information of an initial location of the subject of the preview image. The determining module is further configured to determine a rotation direction and a rotation angle that are of the electronic device after the electronic device rotates, and determine the angle for rotating and the direction for rotating of the camera according to the rotation direction and the rotation angle that are of the electronic device, where the angle for rotating of the camera is the same as the rotation angle of the electronic device, and the direction for rotating of the camera is opposite to the rotation direction of the electronic device, and the adjustment module is further configured to rotate the camera according to the angle for rotating and the direction for rotating of the camera, until the subject of the preview image returns to the initial location.

With reference to the second aspect of the present disclosure, in a fourth possible implementation manner of the second aspect of the present disclosure, when the parameter of the preview image is the exposure quality information of the preview image of the camera, the obtaining module is further configured to obtain brightness distribution information of the preview image of the camera, and obtain the exposure quality information of the preview image according to the brightness distribution information of the preview image, where the exposure quality information of the preview image includes overexposure, normal exposure, or underexposure. The determining module is further configured to determine, according to the exposure quality information of the preview image, whether the camera needs to be rotated, divide the preview image of the camera into N sub-images in a direction parallel to a rotation axis of the camera if the camera needs to be rotated, where N is greater than or equal to 2, and obtain brightness distribution information of the N sub-images, and determine the direction for rotating of the camera by comparing each piece of the brightness distribution information of the N sub-images with the brightness distribution information of the preview image, and the adjustment module is further configured to rotate the camera according to the direction for rotating of the camera, until exposure quality of the preview image meets a preset condition, and then stop rotating the camera.

With reference to the fourth possible implementation manner of the second aspect of the present disclosure, in a fifth possible implementation manner of the second aspect of the present disclosure, determining the direction for rotating of the camera by comparing each piece of the brightness distribution information of the N sub-images with the brightness distribution information of the preview image includes comparing the brightness distribution information of the preview image with each piece of brightness distribution information of a first sub-image and a last sub-image that are in the N sub-images to determine a sub-image that affects the exposure quality of the preview image, where the first sub-image and the last sub-image are two sub-images that are of the preview image and that are respectively located at two ends, and determining that the direction for rotating of the camera is a direction in which the first sub-image is shifted out of the shot of the camera if the first sub-image is the sub-image that affects the exposure quality of the preview image, or determining that the direction for rotating of the camera is a direction in which the last sub-image is shifted out of the shot of the camera if the last sub-image is the sub-image that affects the exposure quality of the preview image.

With reference to the fourth or the fifth possible implementation manner of the second aspect of the present disclosure, in a sixth possible implementation manner of the second aspect of the present disclosure, rotating the camera according to the direction for rotating of the camera, until exposure quality of the preview image meets a condition, and then stop rotating the camera includes rotating the camera according to the direction for rotating of the camera, and obtaining the brightness distribution information of the preview image in a rotation process, determining, according to the brightness distribution information of the preview image, whether the exposure quality of the preview image meets the preset condition, and stop rotating the camera if the exposure quality of the preview image meets the preset condition, or continue rotating the camera according to the direction for rotating of the camera if the exposure quality of the preview image does not meet the preset condition, until the exposure quality of the preview image meets the preset condition, and then stop rotating the camera.

With reference to the sixth possible implementation manner of the second aspect of the present disclosure, in a seventh possible implementation manner of the second aspect of the present disclosure, determining, according to the brightness distribution information of the preview image, whether the exposure quality of the preview image meets the preset condition includes obtaining the exposure quality information of the preview image and a brightness distribution variance of the preview image according to the brightness distribution information of the preview image, and determining that the exposure quality of the preview image meets the preset condition if the exposure quality information of the preview image is the normal exposure, or determining that the exposure quality of the preview image meets the preset condition if the exposure quality information of the preview image is the underexposure or the overexposure, but the brightness distribution variance of the preview image is less than a preset brightness distribution variance threshold.

With reference to the second aspect of the present disclosure, in an eighth possible implementation manner of the second aspect of the present disclosure, when the parameter of the preview image is the image composition information of the preview image of the camera, the obtaining module is further configured to determine image composition of the subject of the preview image. The determining module is further configured to match the image composition of the subject of the preview image with multiple prestored image composition templates to determine target image composition that matches the image composition of the subject of the preview image, and determine the direction for rotating of the camera according to a location deviation between the image composition of the subject of the preview image and the target image composition, and the adjustment module is further configured to rotate the camera according to the direction for rotating of the camera, until image composition quality of the preview image meets a preset condition, and then stop rotating the camera.

With reference to the eighth possible implementation manner of the second aspect of the present disclosure, in a ninth possible implementation manner of the second aspect of the present disclosure, rotating the camera according to the direction for rotating of the camera, until image composition quality of the preview image meets a preset condition, and then stop rotating the camera includes rotating the camera according to the direction for rotating of the camera, obtaining the image composition of the subject of the preview image in a rotation process, determining whether the location deviation between the image composition of the subject of the preview image and the target image composition is less than a preset deviation threshold, and stop rotating the camera if the location deviation between the image composition of the subject of the preview image and the target image composition is less than the deviation threshold, or continue adjusting the camera according to the adjustment direction if the location deviation between the image composition of the subject of the preview image and the target image composition is not less than the preset deviation threshold, until the location deviation between the image composition of the subject of the preview image and the target image composition is less than the deviation threshold, and then stop rotating the camera.

With reference to the eighth or the ninth possible implementation manner of the second aspect of the present disclosure, in a tenth possible implementation manner of the second aspect of the present disclosure, determining image composition of the subject of the preview image includes obtaining the image composition of the subject of the preview image in at least one manner of horizontal/vertical projection, edge detection, shape analysis, or color analysis.

A third aspect of the present disclosure provides an electronic device, including a camera, a processor, a memory, and a system bus, where the memory and the camera are connected to the processor using the system bus. The memory is configured to store a computer executable instruction, and the processor is configured to run the computer executable instruction to execute the method according to any one of the first aspect of the present disclosure, or the first to the tenth possible implementation manners of the first aspect of the present disclosure.

According to the automatic camera adjustment method and the electronic device provided in the embodiments of the present disclosure, the method is applied to an electronic device with a rotatable camera. The electronic device obtains a parameter of a preview image in a shot of the camera, determines a parameter for rotating of the camera according to the parameter of the preview image, and adjusts an azimuth of the camera according to the parameter for rotating of the camera. The parameter of the preview image may be any information of location information of a subject of the preview image, exposure quality information of the preview image, or image composition information of the preview image. Quality of a photographed image may be improved by means of adjusting the camera.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

An automatic camera adjustment method provided in the embodiments of the present disclosure may be applied to an electronic device with a rotatable camera. The electronic device may be any mobile or portable electronic device, and includes but is not limited to a smartphone, a tablet computer, a personal digital assistant (PDA), a media player, a smart television, a camera, a video camera, a combination of the foregoing two or more items, and the like.

Figure 1:
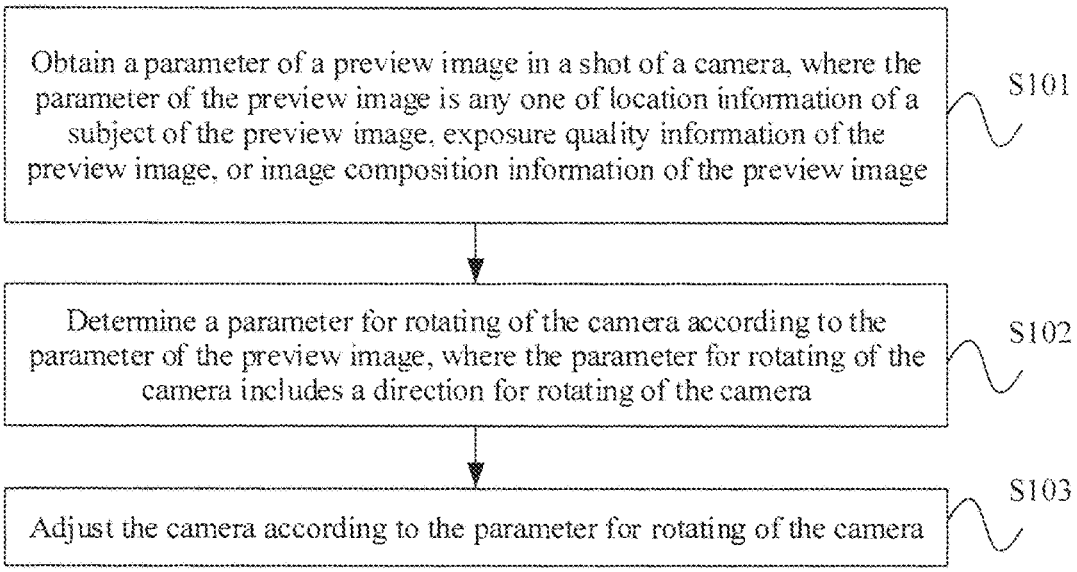
FIG. 1 is a flowchart of an automatic camera adjustment method according to Embodiment 1 of the present disclosure.

FIG. 1 is a flowchart of an automatic camera adjustment method according to Embodiment 1 of the present disclosure. The automatic camera adjustment method provided in this embodiment of the present disclosure is executed by the foregoing electronic device, and may be further implemented by a module or chip having a processing function in the foregoing electronic device, such as a central processing unit (CPU). As shown in FIG. 1, the method provided in this embodiment may include the following steps.

Step S101: Obtain a parameter of a preview image in a shot of a camera, where the parameter of the preview image is any one of location information of a subject of the preview image, exposure quality information of the preview image, or image composition information of the preview image.

Step S102: Determine a parameter for rotating of the camera according to the parameter of the preview image, where the parameter for rotating of the camera includes a direction for rotating of the camera.

An operation of obtaining the parameter of the preview image may be performed by an application that is used to complete an automatic camera adjustment function on the electronic device. When a user needs to perform photographing, the user starts the application, and the electronic device starts to obtain the parameter of the preview image.

When the user uses the camera to perform photographing, the user holds the electronic device. In a photographing process, after the preview image in the shot is still, a hand of the user may shake slightly, which causes the electronic device to rotate slightly, thereby affecting quality of a photographed image. In this embodiment, when the parameter of the preview image is the location information of the subject of the preview image, the parameter for rotating of the camera includes the direction for rotating of the camera, or includes the direction for rotating and an angle for rotating that are of the camera. The subject of the preview image is an object primarily presented by the preview image. The subject is a core of an image, and the subject includes main characters of a figure, an animal, a plant, a scenery, and the like. An accelerometer and/or a gyroscope in the electronic device may detect slight rotating of the electronic device. Then, the angle for rotating and the direction for rotating that are of the camera are determined according to a rotation direction and a rotation angle that are of the electronic device, or the direction for rotating of the camera is determined according to the location information of the subject of the preview image, an azimuth of the camera is adjusted according to the angle for rotating and the direction for rotating that are of the camera, or an azimuth of the camera is adjusted according to the direction for rotating of the camera in order to compensate for impact of rotation of an electronic device body on the image.

When the parameter of the preview image is the exposure quality information of the preview image, the parameter for rotating of the camera includes the direction for rotating of the camera. The exposure quality information of the preview image may be further obtained using brightness distribution information of the preview image. The exposure quality information of the preview image includes overexposure, underexposure, or normal exposure, and the brightness distribution information of the preview image may further include an average brightness value, a brightness distribution range, a brightness peak value and trough value that are of the preview image. The brightness distribution information of the preview image may be represented using a brightness histogram (Intensity Histogram), and the brightness histogram may be classified into a color channel histogram and a gradation histogram. Whether to adjust the camera is determined according to the exposure quality information of the preview image. If the preview image is overexposed or underexposed, the camera needs to be adjusted to improve exposure quality of the preview image. If the preview image is normally exposed, the camera does not need to be adjusted.

When the parameter of the preview image is the image composition information of the preview image, the parameter for rotating of the camera includes a direction for rotating of the camera. Image composition of the image means that a location and a size that are of the subject are properly arranged and processed in specific space to obtain an optimal layout of the image, and implement a consistent aesthetical feel to images. In this embodiment, the image composition information of the preview image of the camera is obtained. Then, the direction for rotating of the camera is determined according to the image composition information of the image, an azimuth of the camera is adjusted to improve image composition quality of the preview image.

Step S103: Adjust the camera according to the parameter for rotating of the camera.

After the parameter for rotating of the camera is determined according to the parameter of the preview image, an electronic driver module of the electronic device drives the camera to rotate, and the camera stops rotating after image quality is not improved any more. Then, photographing or video recording is performed.

According to the method in this embodiment, an electronic device obtains a parameter of a preview image in a shot of a camera, determines a parameter for rotating of the camera according to the parameter of the preview image, and adjusts the camera according to the parameter for rotating of the camera. The parameter of the preview image may be location information of a subject of the preview image, exposure quality information of the preview image, or image composition information of the preview image. Quality of a photographed image may be improved by means of adjusting the camera.

Figure 2:
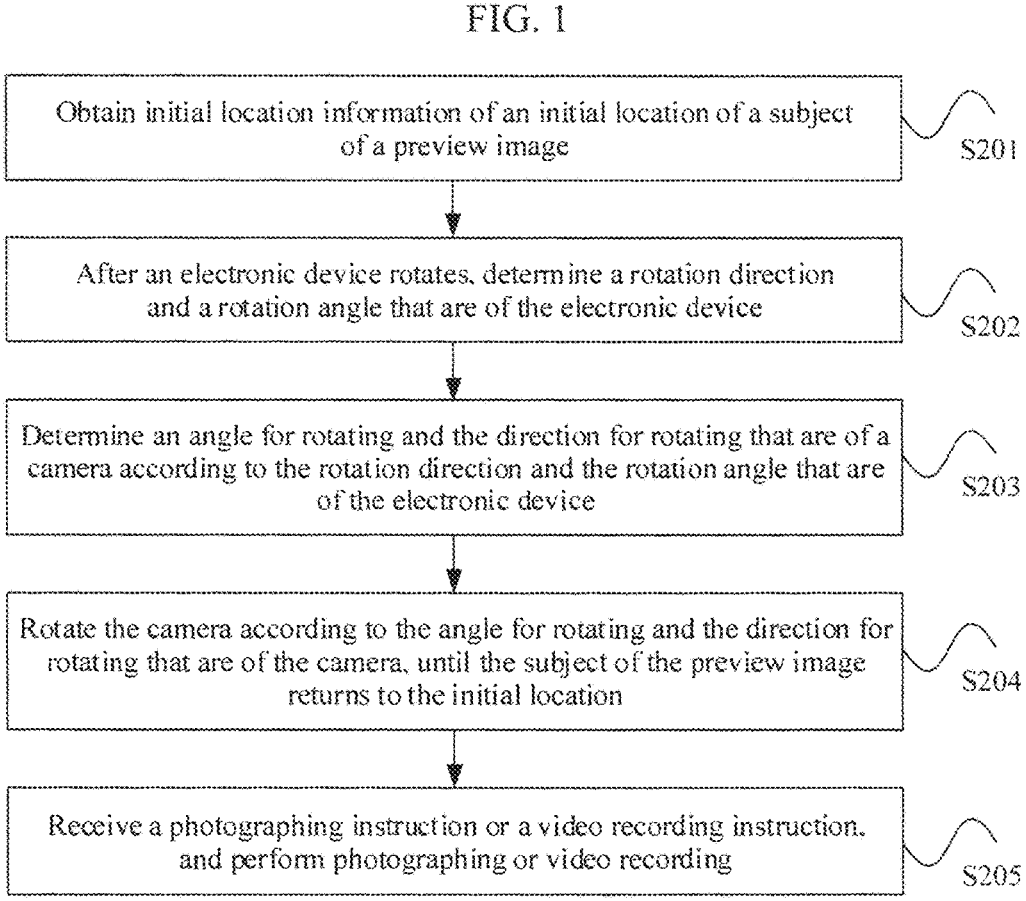
FIG. 2 is a flowchart of an automatic camera adjustment method according to Embodiment 2 of the present disclosure.

FIG. 2 is a flowchart of an automatic camera adjustment method according to Embodiment 2 of the present disclosure. In this embodiment, how to automatically adjust the camera when the parameter of the preview image is the location information of the subject of the preview image is described in detail based on Embodiment 1. As shown in FIG. 2, the method in this embodiment may include the following steps.

Step S201: Obtain initial location information of an initial location of the subject of the preview image.

The user may manually rotate the camera of the electronic device to a preset angle, or the user rotates the camera to a preset angle by adjusting an angle of the electronic device body, or the camera automatically rotates to a preset angle. After the camera rotates to the preset angle, the preview image is displayed in the shot of the camera, and in this case, a location of the subject of the preview image is the initial location. A noticeable edge of the preview image and a center point in a brightness peak value range may be obtained in at least one manner of horizontal/vertical projection, an edge detection result, shape analysis, or color analysis. Generally, at least three points that are not in a same straight line need to be detected to obtain the subject of the preview image, and coordinate locations of the at least three points are used as the initial location information of the subject of the preview image.

Figure 3:
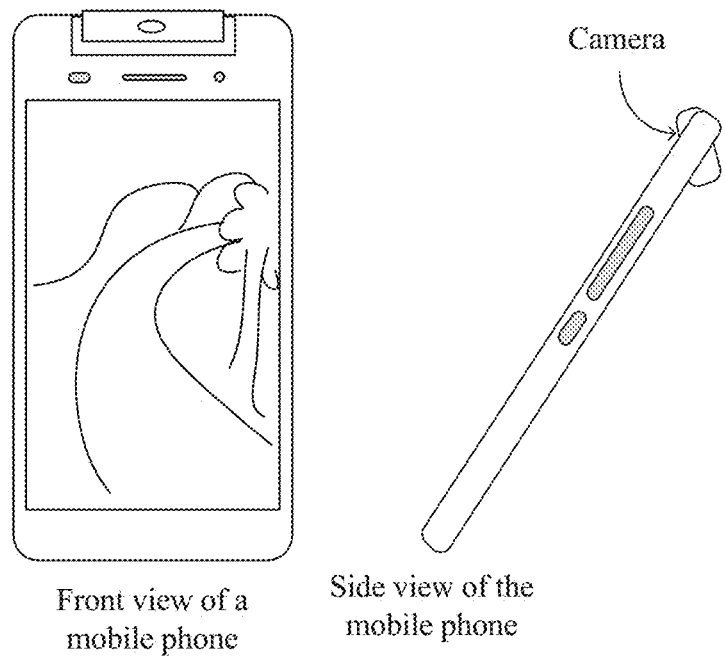
FIG. 3 is a schematic diagram of a front and a side of a mobile phone during preview image displaying according to an embodiment of the present disclosure.

FIG. 3 is a schematic diagram of a front and a side of a mobile phone during preview image displaying according to an embodiment of the present disclosure. As shown in FIG. 3, a preview image displayed on a screen of a mobile phone can be seen from the schematic diagram of the front of the mobile phone, and the schematic diagram of the side of the mobile phone is a status diagram obtained after the camera rotates to the preset angle.

Step S202: After the electronic device rotates, determine a rotation direction and a rotation angle that are of the electronic device.

Further, motion data of the electronic device may be collected using a motion detection apparatus in the electronic device, and the rotation direction and the rotation angle that are of the electronic device are determined according to the motion data of the electronic device. The motion detection apparatus may be the gyroscope and/or the accelerometer. Motion data measured by the gyroscope reflects a rotation angular velocity of the electronic device body. When the electronic device body rotates, the camera moves in a direction that is the same as a rotation direction of the electronic device body. Data measured by the gyroscope is an angular velocity of the electronic device relative to a coordinate system at each measurement moment. A unit of the angular velocity is degree per second (dps or °/s), and the data measured by the gyroscope is shown in Table 1:

TABLE 1

| Time in milliseconds (ms) | X-axis (°/s) | Y-axis (°/s) | Z-axis (°/s) |
| --- | --- | --- | --- |
| 0 | 1 | 2 | 1 |
| 50 | 10 | 3 | 2 |
| 100 | 30 | 2 | 2 |
| 150 | 35 | 2 | 2 |
| 200 | 40 | 2 | 2 |
| 250 | 30 | 2 | 2 |
| 300 | 12 | 1 | 2 |
| 350 | −10 | 2 | 2 |
| 400 | −20 | 2 | 3 |
| 450 | −30 | 2 | 2 |
| 500 | −50 | 2 | 2 |
| 550 | −40 | 1 | 2 |
| 600 | −20 | 2 | 1 |
| 650 | −10 | 2 | 2 |

A three-dimensional coordinate system is set inside the electronic device, and the data measured by the gyroscope is the angular velocity of the electronic device relative to the coordinate system at each measurement moment, that is, an angular velocity of the electronic device relative to an X-axis, a Y-axis, and a Z-axis that are of the coordinate system. The angular velocity and the rotation direction of the electronic device follow the Ampere's rule, that is, when a thumb of a right hand points to a direction of the angular velocity, the rotation direction of the electronic device is a curl direction of the other four fingers. The direction of the angular velocity includes a positive direction and a negative direction. In Table 1, a positive number indicates that the direction of the angular velocity is the positive direction, and a negative number indicates that the direction of the angular velocity is the negative direction. The rotation direction of the electronic device may be determined according to the direction of the angular velocity. As shown in Table 1, there are four columns of data in total in Table 1. The first column indicates time (a unit is ms), the second column indicates an angular velocity of the electronic device body rotating around the X-axis, the third column indicates an angular velocity of the electronic device body rotating around the Y-axis, and the fourth column indicates an angular velocity of the electronic device body rotating around the Z-axis. The gyroscope records the angular velocity of the electronic device once every 50 ms.

Motion data measured by the accelerometer reflects linear motion of the electronic device body, and is generally shown using the three-dimensional coordinate system. When the electronic device body is still, the electronic device body has a gravity acceleration that points to ground. A direction of the gravity acceleration may reflect an azimuth status of the body, and a change of the gravity acceleration may reflect displacement motion of the electronic device. Table 2 is a schematic diagram of the motion data collected by the accelerometer:

TABLE 2

| Time (ms) | X-axis (meters per second square (m/s$^2$)) | Y-axis (m/s$^2$) | Z-axis (m/s$^2$) |
| --- | --- | --- | --- |
| 0 | 0 | 5.1 | 7.6 |
| 50 | 0.1 | 5.2 | 7.5 |
| 100 | 0 | 5.4 | 7.3 |
| 150 | −0.1 | 5.7 | 7.1 |
| 200 | 0 | 5.9 | 7.1 |
| 250 | 0.1 | 6.1 | 6.9 |
| 300 | 0.2 | 6.2 | 6.8 |
| 350 | 0.1 | 6.1 | 6.9 |
| 400 | 0 | 5.9 | 7.1 |
| 450 | −0.1 | 5.7 | 7.2 |
| 500 | −0.2 | 5.4 | 7.3 |
| 550 | −0.1 | 5.2 | 7.5 |
| 600 | 0 | 5.1 | 7.6 |
| 650 | 0 | 5.2 | 7.5 |
| 700 | −0.1 | 5.4 | 7.3 |

In Table 2, the accelerometer records motion data of the body once every 50 ms. Data measured by the accelerometer is acceleration values of the body in the X-axis, the Y-axis, and the Z-axis. Directions of the accelerations in Table 2 also include a positive direction and a negative direction, and the accelerometer determines the rotation direction of the electronic device according to a change direction obtained by comparing angles between the body and the gravity acceleration before and after rotating.

The rotation direction of the electronic device may be obtained according to the angular velocity measured by the gyroscope and using the Ampere's rule. The rotation angle of the electronic device may be obtained by means of calculation in the following manner. For example, the rotation angle of the electronic device is calculated according to the angular velocity values measured by the gyroscope in Table 1, angular velocity values obtained within 0-300 ms are accumulated over time, and an angle of the electronic device rotating around the X-axis within this period of 0-300 ms can be obtained: (1+10+30+35+40+30)×0.05=7.3°. There is zero-drifted noise in the Y-axis and the Z-axis, which may not be considered. Therefore, the rotation angle of the electronic device is 7.3 degrees of rotating around the X-axis. In a period of 350-600 ms, values of an angular velocity relative to the X-axis are negative numbers, and indicate that the electronic device rotates in an opposite direction. It may be considered that the device performs rotation motion once during a period of 0-600 ms.

Alternatively, the rotation angle of the electronic device is calculated according to acceleration data that is in Table 2 and that is measured by the accelerometer. In this manner, a principle that the gravity acceleration g is a constant is mainly used. A change of an included angle between the electronic device and a gravity direction is obtained according to gravity acceleration components in the Y-axis and the Z-axis. A ratio between the gravity acceleration components in the Y-axis and the Z-axis is a tangent value of the angle between the electronic device and the gravity direction. According to the data in Table 2, a tangent of an initial included angle between the device and a vertical direction is z/y=7.6/5.1, and an included angle $\alpha$ is a tan(7.6/5.1)=56.1°, at a moment of 50 ms, an included angle is a tan(7.5/5.2)=55.3°, at a moment of 300 ms, an included angle $\beta$ is a tan(6.8/6.2)=47.6°. During a period of 0-300 ms, the device rotates by ($\alpha-\beta$)=8.5° in total around the X-axis, that is, the rotation angle of the electronic device is 8.5°. The rotation direction of the electronic device follows the Ampere's rule. When the thumb of the right hand points to the direction of the angular velocity, the curl direction of the other four fingers is the rotation angle of the electronic device. Similarly, during a period of 300-600 ms, the electronic device rotates by (−8.5°), and returns to the initial location. It may be considered that the device performs back and forth rotation motion once during a period of 0-600 ms.

Step S203: Determine an angle for rotating and the direction for rotating that are of the camera according to the rotation direction and the rotation angle that are of the electronic device.

Because the camera and the electronic device have a same motion state to compensate for impact of rotation of the electronic device on the preview image, the direction for rotating of the camera is opposite to the rotation direction of the electronic device, the angle for rotating of the camera is the same as the rotation angle of the electronic device. For example, it is obtained, by means of calculation according to the data shown in Table 1, that a rotation angle of the electronic device around the X-axis is 7.3°, and rotation angles of the electronic device around the Y-axis and the Z-axis are 0, the rotation direction of the electronic device is a positive direction around the X-axis, and the direction for rotating of the camera is an opposite direction around the X-axis, an angle for rotating of the camera around the X-axis is 7.3°, and angles for rotating of the camera around the Y-axis and Z-axis are 0.

Optionally, an adjustment angle of the camera is different from the rotation angle of the electronic device, and the angle for rotating of the camera is obtained by means of calculating the rotation angle of the electronic device according to a specific algorithm.

Step S204: Rotate the camera according to the angle for rotating and the direction for rotating that are of the camera, until the subject of the preview image returns to the initial location.

Figure 4:
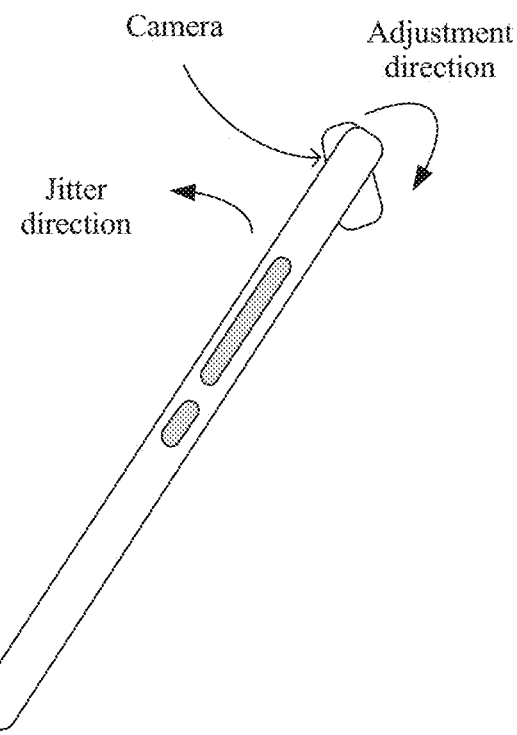
FIG. 4 is a schematic diagram of a camera adjustment action according to an embodiment of the present disclosure.

An electronic driver unit is disposed in the electronic device, and the electronic driver unit drives the camera to rotate in order to compensate for the rotation of the electronic device. FIG. 4 is a schematic diagram of a camera adjustment action according to an embodiment of the present disclosure. As shown in FIG. 4, the rotation direction of the electronic device is a direction that points to the user, and therefore, the direction for rotating of the camera is a direction that is opposite to the user.

Step S205: Receive a photographing instruction or a video recording instruction, and perform photographing or video recording.

Figure 5:
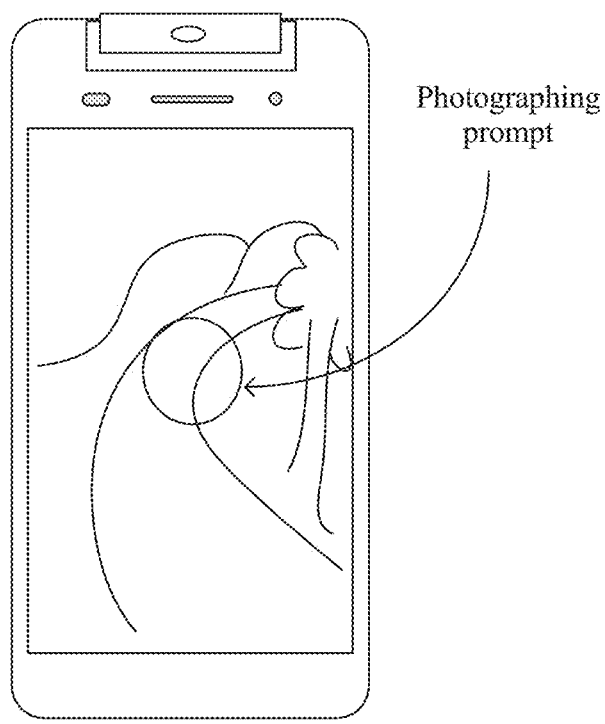
FIG. 5 is a schematic diagram of photographing according to an embodiment of the present disclosure.

FIG. 5 is a schematic diagram of photographing according to an embodiment of the present disclosure. As shown in FIG. 5, when a photographing prompt appears in the shot, the user taps a photographing prompt button, and the electronic device receives the photographing instruction and performs photographing. In a process of photographing or video recording, compensating for the body rotation continues to be performed, that is, in the entire process of photographing or video recording, the electronic device detects the body rotation in real time such that the camera is adjusted in a timely manner.

According to the method in this embodiment, a camera is first rotated to a preset angle, initial location information of an initial location of a subject of the preview image is obtained after a preview image appears in a shot of the camera. After an electronic device rotates, a rotation angle and a rotation direction that are of the electronic device are determined, a direction for rotating and an angle for rotating that are of the camera are determined according to the rotation angle and the rotation direction that are of the electronic device, and the camera is adjusted according to the direction for rotating and the angle for rotating that are of the camera such that the subject of the preview image returns to the initial location, to compensate for impact of rotation of the electronic device on image photographing, and improve quality of a photographed image.

Figure 6:
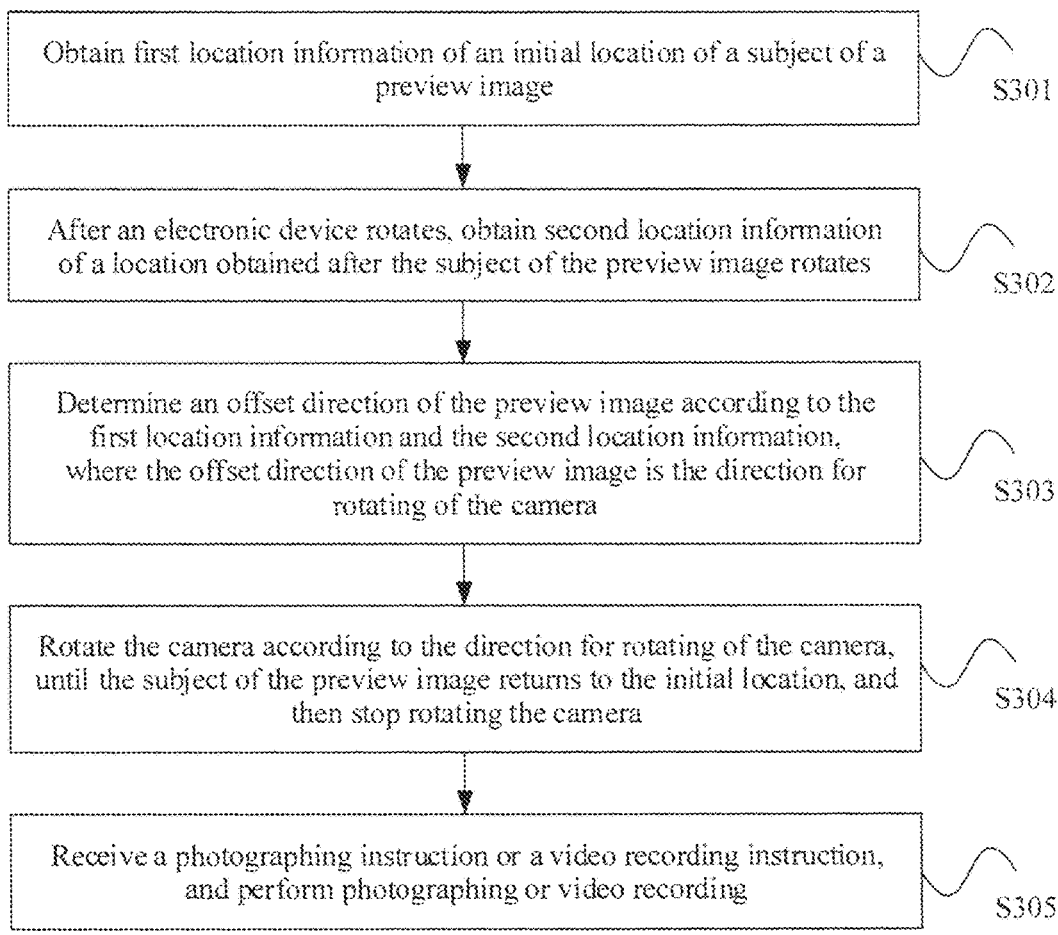
FIG. 6 is a flowchart of an automatic camera adjustment method according to Embodiment 3 of the present disclosure.

FIG. 6 is a flowchart of an automatic camera adjustment method according to Embodiment 3 of the present disclosure. In this embodiment, how to automatically adjust the camera when the parameter of the preview image is the location information of the subject of the preview image is described in detail based on Embodiment 1. As shown in FIG. 6, the method in this embodiment may include the following steps.

Step S301: Obtain first location information of an initial location of the subject of the preview image.

For a specific implementation manner of step S301, refer to a related description in Embodiment 2, and details are not described herein again.

Step S302: After the electronic device rotates, obtain second location information of a location obtained after the subject of the preview image rotates.

After the electronic device rotates when a user handshakes, a noticeable edge of a preview image obtained after rotation and a center point in a brightness peak value range may be obtained by means of horizontal/vertical projection, an edge detection result, shape analysis, color analysis, or the like. Generally, at least three points that are not in a same straight line need to be detected to obtain the subject of the preview image, and coordinate locations of the at least three points are used as the second location information of a location obtained after the subject of the preview image rotates. Further, a motion detection apparatus in the electronic device may be used to detect whether the electronic device moves. If it is detected that the electronic device moves, the second location information of the location obtained after the preview image rotates is obtained.

Step S303: Determine an offset direction of the preview image according to the first location information and the second location information, where the offset direction of the preview image is the direction for rotating of the camera.

The first location information of the subject of the preview image is compared with the second location information obtained after the rotation, to determine the offset direction of the preview image relative to the initial location. To move the subject of the preview image to the initial location, the offset direction of the preview image is used as the direction for rotating of the camera.

Step S304: Rotate the camera according to the direction for rotating of the camera, until the subject of the preview image returns to the initial location, and then stop rotating the camera.

In a process of rotating the camera, the electronic device detects a location of the subject of the preview image in real time, until the subject of the preview image returns to the initial location, and then stops rotating the camera.

Step S305: Receive a photographing instruction or a video recording instruction, and perform photographing or video recording.

According to the method in this embodiment, a camera is first rotated to a preset angle. After a preview image appears in a shot of the camera, first location information of an initial location of a subject of the preview image is obtained. After an electronic device rotates, second location information of a location obtained after the subject of the preview image rotates. An offset direction of the preview image is determined according to the first location information and the second location information that are of the subject of the preview image. The offset direction of the preview image is used as a direction for rotating of the camera such that the subject of the preview image returns to the initial location to compensate for impact of rotation of the electronic device on image photographing, and improve quality of a photographed image.

Figure 7:
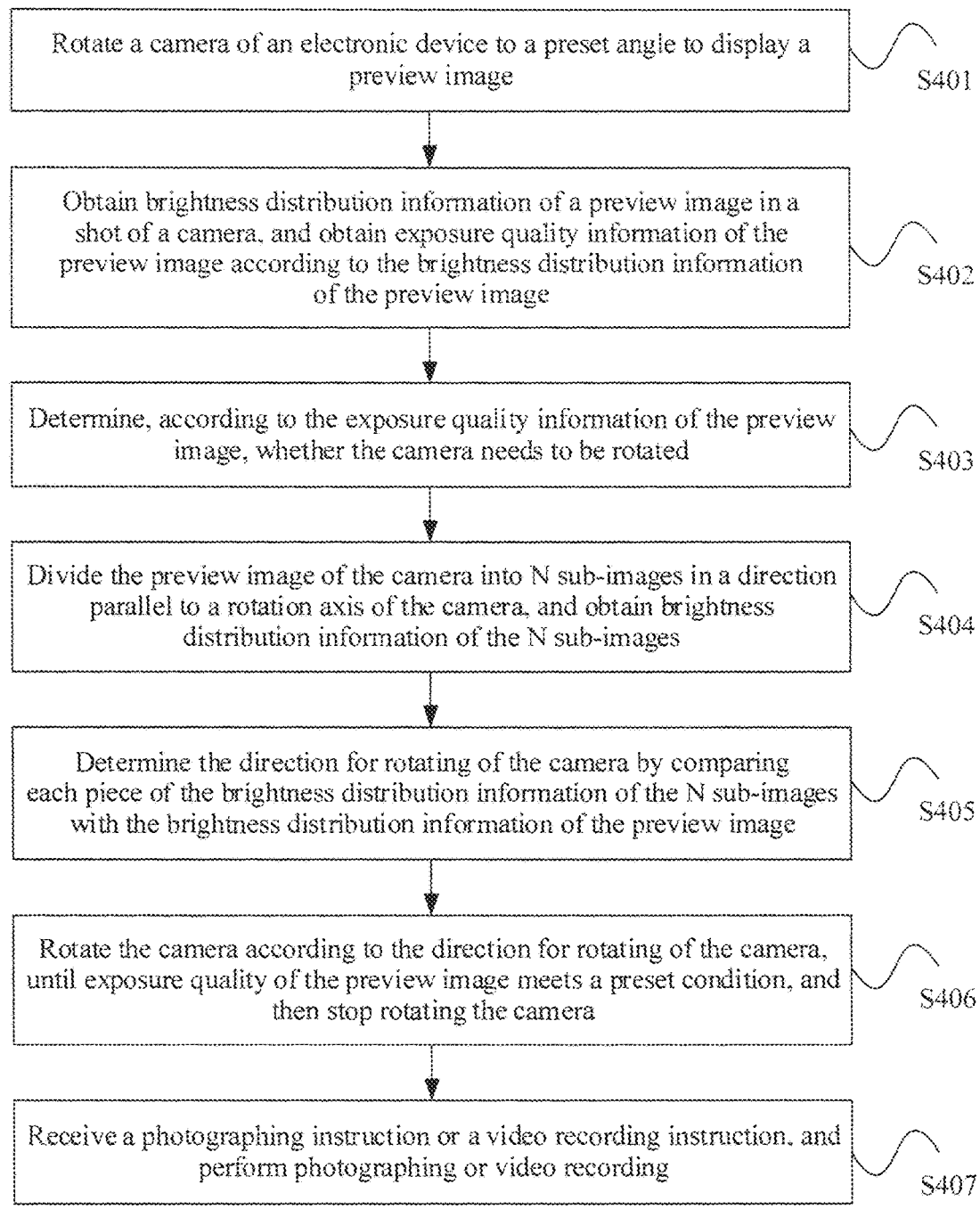
FIG. 7 is a flowchart of an automatic camera adjustment method according to Embodiment 4 of the present disclosure.

FIG. 7 is a flowchart of an automatic camera adjustment method according to Embodiment 4 of the present disclosure. In this embodiment, how to automatically adjust the camera when the parameter of the preview image is the exposure quality information of the preview image is described in detail based on Embodiment 1. As shown in FIG. 7, the method in this embodiment may include the following steps.

Step S401: Rotate the camera of the electronic device to a preset angle to display the preview image.

For a specific implementation manner of step S401, refer to a related description of step S201 in Embodiment 2, and details are not described herein again.

Step S402: Obtain brightness distribution information of the preview image in the shot of the camera, and obtain the exposure quality information of the preview image according to the brightness distribution information of the preview image.

The exposure quality information of the preview image includes the overexposure, the normal exposure, or the underexposure. The brightness distribution information of the preview image may further include the average brightness value, the brightness distribution range, the brightness peak value and trough value that are of the preview image.

Step S403: Determine, according to the exposure quality information of the preview image, whether the camera needs to be rotated.

If the exposure quality information of the preview image is the overexposure or the underexposure, it is determined that the camera needs to be rotated. If the exposure quality information of the preview image is the normal exposure, it is determined that the camera does not need to be rotated.

Step S404: Divide the preview image of the camera into N sub-images in a direction parallel to a rotation axis of the camera, and obtain brightness distribution information of the N sub-images.

N is greater than or equal to 2.

It should be noted that steps S404 to S407 are performed after it is determined that the camera needs to be rotated in step S403.

Step S405: Determine the direction for rotating of the camera by comparing each piece of the brightness distribution information of the N sub-images with the brightness distribution information of the preview image.

Further, the average brightness value, the brightness distribution range, the brightness peak value and trough value that are of the preview image may be sequentially compared with an average brightness value, a brightness distribution range, a brightness peak value and trough value that are of each sub-image in order to determine a sub-image that affects overall exposure quality of the preview image. If brightness distribution information of a sub-image has a greatest difference from the brightness distribution information of the preview image, it is determined that the sub-image is the sub-image that affects the exposure quality of the preview image. To improve overall exposure quality of the image, the sub-image needs to be shifted out of the shot, and the direction for rotating of the camera is a direction in which the sub-image is shifted out of the shot.

Alternatively, the brightness distribution information of the preview image is compared only with each piece of brightness distribution information of a first sub-image and a last sub-image that are in the N sub-images to determine the sub-image that affects the exposure quality of the preview image. The first sub-image and the last sub-image are two sub-images that are of the preview image and that are respectively located at two ends. If the first sub-image is the sub-image that affects the exposure quality of the preview image, it is determined that the direction for rotating of the camera is a direction in which the first sub-image is shifted out of the shot of the camera. If the last sub-image is the sub-image that affects the exposure quality of the preview image, it is determined that the direction for rotating of the camera is a direction in which the last sub-image is shifted out of the shot of the camera.

Figure 8:
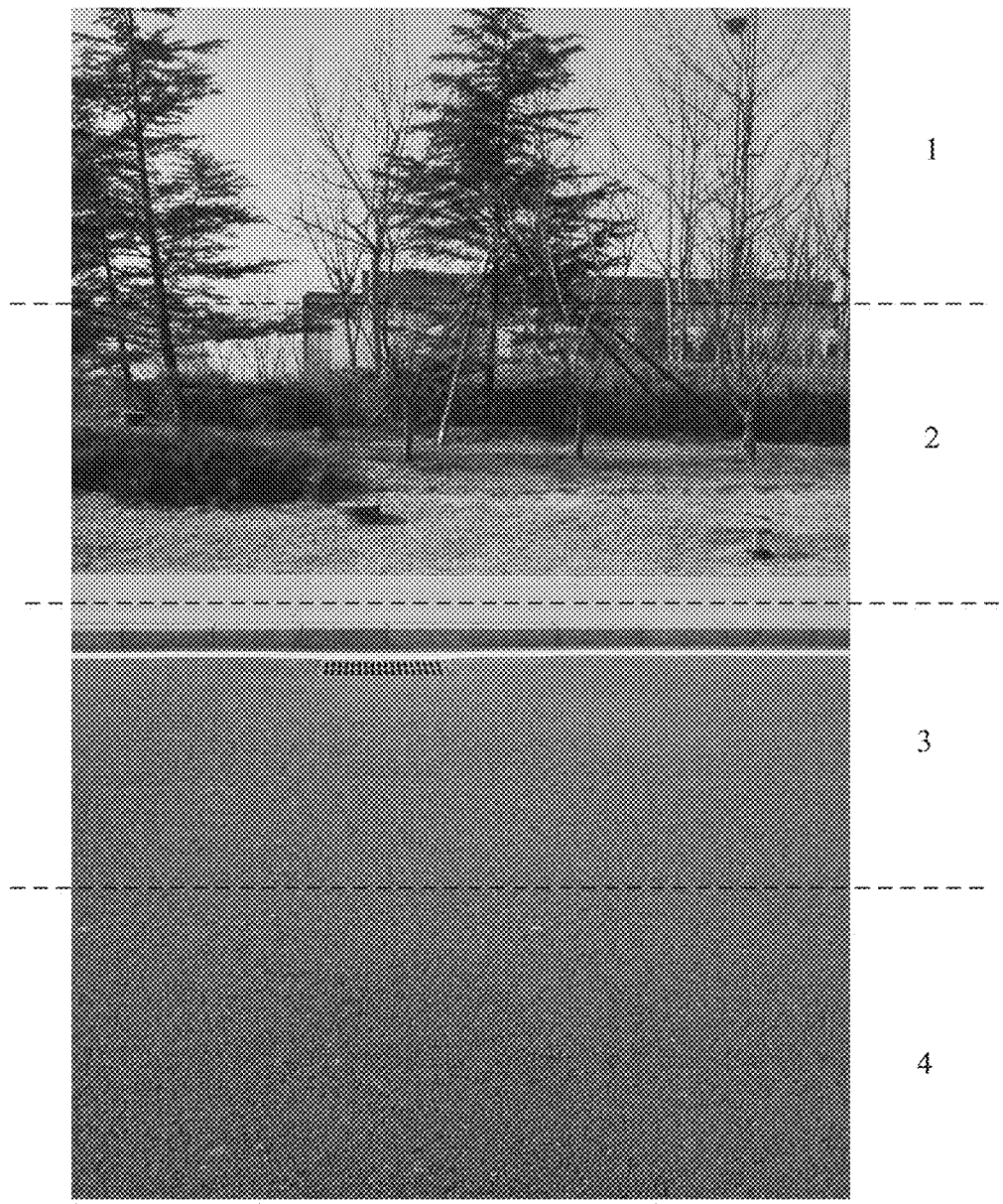
FIG. 8 is a schematic diagram of dividing a preview image according to an embodiment of the present disclosure.
Figure 9:
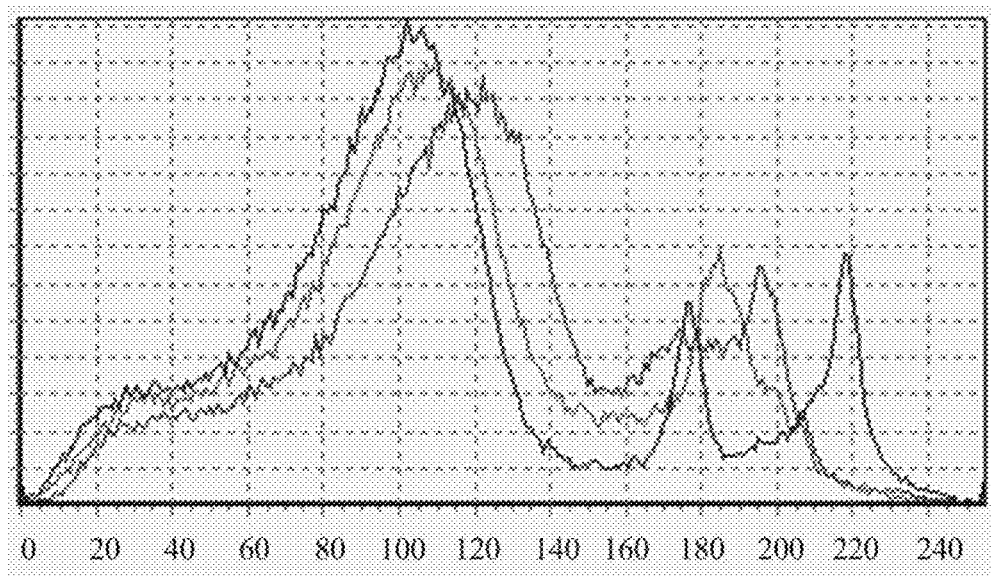
FIG. 9 is a brightness histogram of the preview image shown in FIG. 8.
Figure 10:
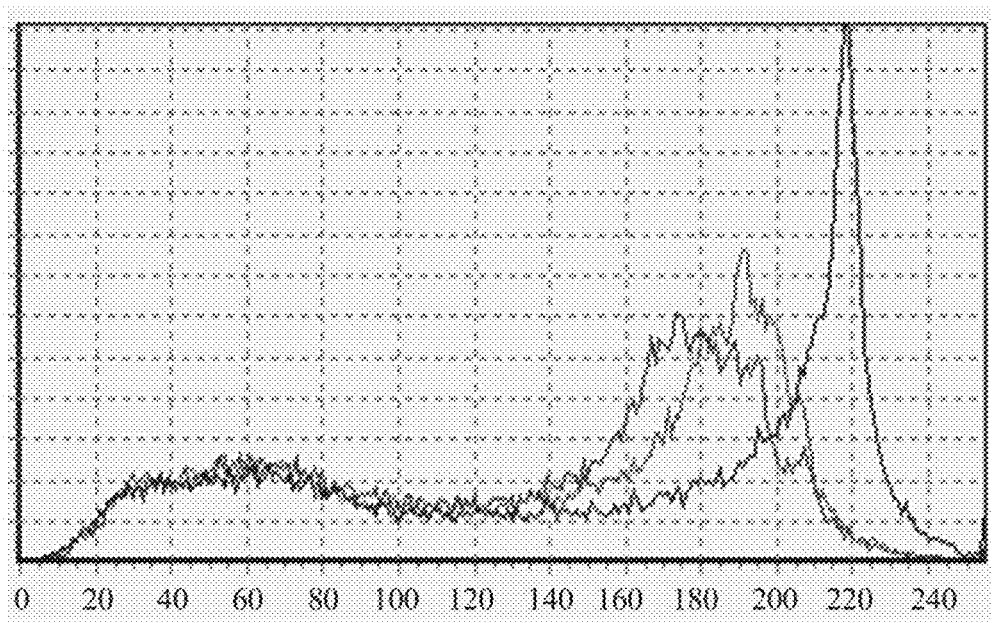
FIG. 10 is a brightness histogram of an uppermost sub-image.
Figure 11:
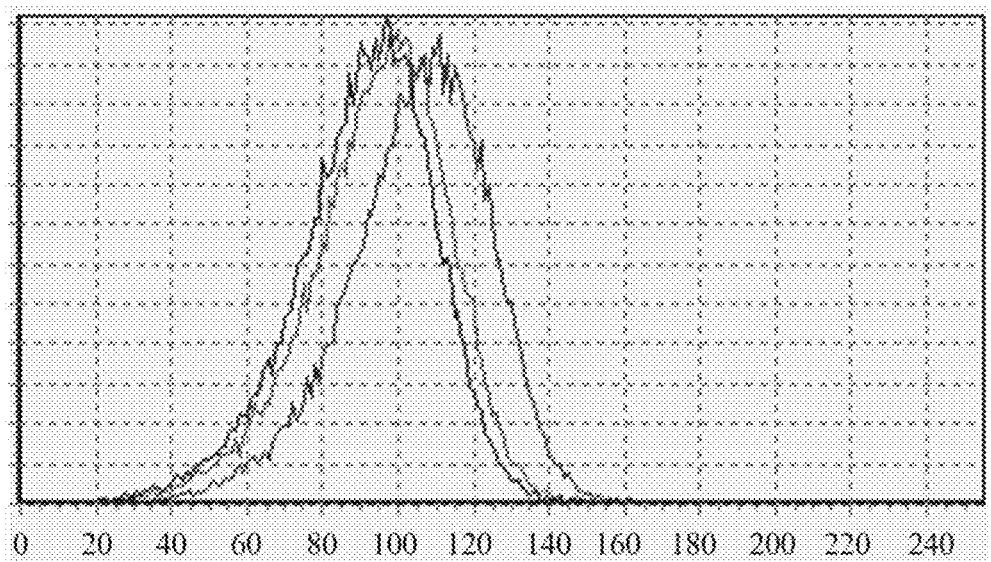
FIG. 11 is a brightness histogram of a lowermost sub-image.

FIG. 8 is a schematic diagram of dividing a preview image according to an embodiment of the present disclosure. As shown in FIG. 8, the preview image is horizontally divided into four sub-images, which are sequentially a sub-image 1, a sub-image 2, a sub-image 3, and a sub-image 4 from the top to the bottom (designated as 1, 2, 3, 4 in FIG. 8). FIG. 9 is a brightness histogram of the preview image shown in FIG. 8. In FIG. 9, a horizontal axis indicates the brightness and brightness values increase sequentially from the left to the right, and the vertical axis indicates a quantity of pixels in each brightness value. It can be seen from FIG. 9 that an overall brightness histogram of the preview image focuses on a darker part. FIG. 10 is a brightness histogram of an uppermost sub-image. It can be seen from FIG. 10 that brightness of the uppermost sub-image is higher. FIG. 11 is a brightness histogram of a lowermost sub-image. It can be seen from FIG. 11 that brightness of the lowermost sub-image is lower, and a darker part peak value of the lowermost sub-image is close to a darker part peak value of the entire preview image. Then FIG. 9 is compared with FIG. 10 and FIG. 11, and it can be learned, by means of comparison, that exposure quality information indicated by the brightness histogram of the lowermost sub-image is consistent with exposure quality information indicated by the brightness histogram of the preview image, that is, both the lowermost sub-image and the entire image are relatively darker, but the uppermost sub-image is normally exposed. Therefore, it may be determined that the lowermost sub-image affects the exposure quality of the entire image. The lowermost sub-image needs to be shifted out of an image shot, and to shift the lowermost sub-image out of the shot, a rotation azimuth of the camera should be upward.

Step S406: Rotate the camera according to the direction for rotating of the camera, until exposure quality of the preview image meets a preset condition, and then stop rotating the camera.

In this embodiment, when to stop rotating the camera may be determined in the following manner. The camera is rotated according to the direction for rotating of the camera, and the brightness distribution information of the preview image is obtained in a rotation process. It is determined, according to the brightness distribution information of the preview image, whether the exposure quality of the preview image meets the preset condition. If the exposure quality of the preview image meets the preset condition, the camera stops rotating. If the exposure quality of the preview image does not meet the preset condition, the camera continues rotating according to the direction for rotating of the camera, until the exposure quality of the preview image meets the condition, and then the camera stops rotating.

That it is determined, according to the brightness distribution information of the preview image, whether the exposure quality of the preview image meets the preset condition includes obtaining the exposure quality information of the preview image and a brightness distribution variance of the preview image according to the brightness distribution information of the preview image. The brightness distribution variance of the preview image may be used as an evaluation criterion that reflects image exposure uniformity. In one manner, if the exposure quality information of the preview image is the normal exposure, it is determined that the exposure quality of the preview image meets the preset condition. In another manner, if the exposure quality information of the preview image is the underexposure or the overexposure, but the brightness distribution variance of the preview image is less than a preset brightness distribution variance threshold, it is determined that the exposure quality of the preview image meets the preset condition.

Step S407: Receive a photographing instruction or a video recording instruction, and perform photographing or video recording.

According to the method in this embodiment, a camera is first rotated to a preset angle. After a preview image appears in a shot of the camera, overall brightness distribution information of the preview image is obtained. The preview image is horizontally divided into N sub-images, and partial brightness distribution information of the N sub-images is obtained. A direction for rotating of the camera is obtained by comparing the overall brightness distribution information of the preview image with the partial brightness distribution information of the N sub-images. The camera is adjusted according to the direction for rotating of the camera, until exposure quality of the preview image meets a preset condition, and then the camera stops rotating such that quality of a photographed image can be improved.

Figure 12:
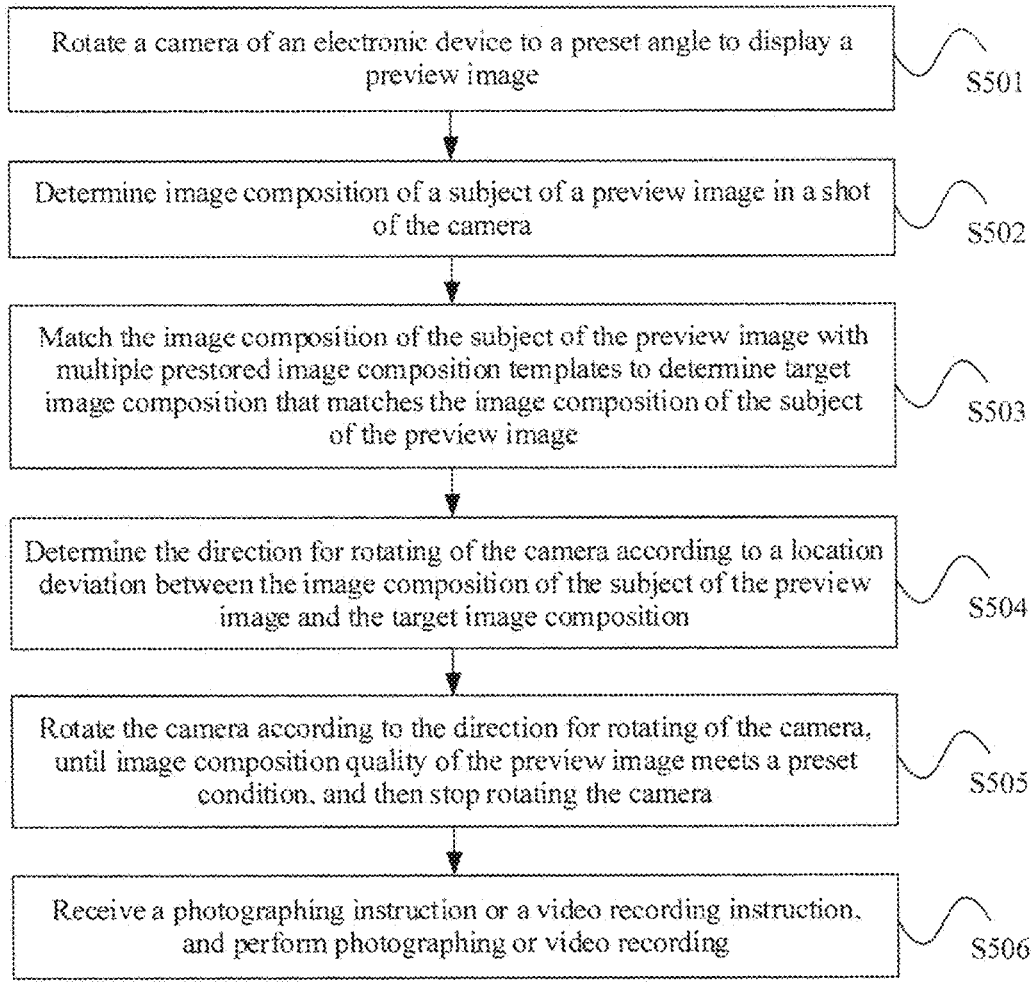
FIG. 12 is a flowchart of an automatic camera adjustment method according to Embodiment 5 of the present disclosure.

FIG. 12 is a flowchart of an automatic camera adjustment method according to Embodiment 5 of the present disclosure. In this embodiment, how to automatically adjust the camera when the parameter of the preview image is the image composition information of the preview image of the camera is described in detail based on Embodiment 1. As shown in FIG. 12, the method in this embodiment may include the following steps.

Step S501: Rotate the camera of the electronic device to a preset angle to display the preview image.

For a specific implementation manner of step S501, refer to a related description of step S201 in Embodiment 2, and details are not described herein again.

Step S502: Determine image composition of the subject of the preview image in the shot of the camera.

Successful image composition means that a subject of an appropriate size is arranged at a proper location such that a major part and a minor part of an image are clearly differentiated to achieve a pleasing effect. Image composition information of the image includes a location and a size of a subject of the image. In this embodiment, the image composition of the subject of the preview image may be obtained in at least one manner of horizontal/vertical projection, an edge detection result, shape analysis, or color analysis.

Step S503: Match the image composition of the subject of the preview image with multiple prestored image composition templates to determine target image composition that matches the image composition of the subject of the preview image.

People obtain several common image composition rules by means of summarizing in long-term photographing and drawing practice, such as the Rule of Thirds, the Best Weight Rule, and the Diagonally Dominant Rule. The Rule of Thirds is one of the most well-known and commonly-used rules in drawing and photographing, and is a practical application of "Golden Ratio Section," which may enable the image to be more vivid and beautiful. Further, the image is divided, using two horizontal lines and vertical lines, into nine equal squares referred to as "Nine Squares." Four points obtained by crossing the vertical line and the horizontal line are places to which people are most visually sensitive, and are referred to as strength points. Therefore, in photographing or drawing, the subject should be placed on the strength points as far as possible.

In this embodiment, some pieces of common image composition template information are prestored in the electronic device, and after the image composition of the subject of the preview image is obtained, the image composition of the subject of the preview image is compared with the image composition template, to determine the target image composition that matches the image composition of the subject of the preview image. A match principle contains that two images match when subjects of the images have similar shapes. A location of the subject of the image may be offset.

Step S504: Determine the direction for rotating of the camera according to a location deviation between the image composition of the subject of the preview image and the target image composition.

Figure 13:
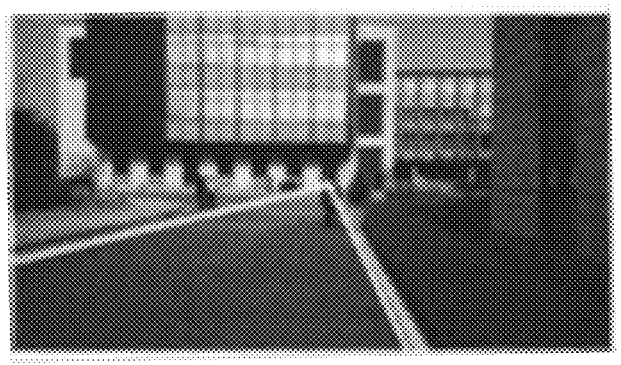
FIG. 13 is a schematic diagram of image composition of an image according to an embodiment of the present disclosure.

In this embodiment, it is considered that two images match provided that subjects of the two images have similar shapes, and a location of a subject of an image is a main factor that affects image composition of the image. In this embodiment, the direction for rotating of the camera is determined according to the location deviation obtained by comparing the image composition of the subject of the preview image and the target image composition. FIG. 13 is a schematic diagram of image composition of an image according to an embodiment of the present disclosure. As shown in FIG. 13, the subject of the image may be obtained by straight lines fitting an intersecting point, and an image composition rule of the image is a golden section rule. It is assumed that a location of the subject of the preview image is in the middle, the subject of the image needs to be moved to a golden section point to improve image composition quality of the image, and therefore, the subject of the image needs to be moved rightward. To move the subject of the image leftward, the camera needs to be moved leftward horizontally such that the direction for rotating of the camera is horizontally leftward.

Figure 14:
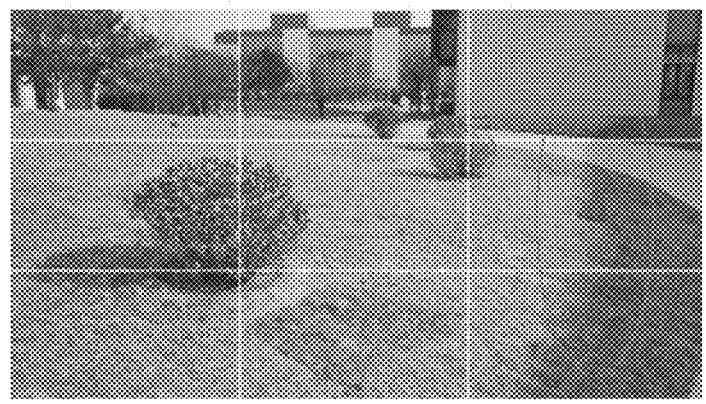
FIG. 14 is another schematic diagram of image composition of an image according to an embodiment of the present disclosure.

FIG. 14 is another schematic diagram of image composition of an image according to an embodiment of the present disclosure. As shown in FIG. 14, the subject of the image uses the Rule of Thirds for image composition, and the subject is on strength points of the Nine Squares.

Step S505: Rotate the camera according to the direction for rotating of the camera, until image composition quality of the preview image meets a preset condition, and then stop rotating the camera.

When to stop rotating the camera may be determined in the following manner. Obtaining the image composition of the subject of the preview image in a rotation process, and determining whether the location deviation between the image composition of the subject of the preview image and the target image composition is less than a preset deviation threshold, and stop rotating the camera if the location deviation between the image composition of the subject of the preview image and the target image composition is less than the deviation threshold, or continue adjusting the camera according to an adjustment direction if the location deviation between the image composition of the subject of the preview image and the target image composition is not less than the preset deviation threshold, until the location deviation between the image composition of the subject of the preview image and the target image composition is less than the deviation threshold, and then stop rotating the camera.

Step S506: Receive a photographing instruction or a video recording instruction, and perform photographing or video recording.

According to the method in this embodiment, a camera is first rotated to a preset angle. After a preview image appears in a shot of the camera, image composition of a subject of the preview image is obtained. The image composition of the subject of the preview image is matched with multiple prestored image composition templates to determine target image composition that matches the image composition of the subject of the preview image. A direction for rotating of the camera is determined according to a location deviation between the image composition of the subject of the preview image and the target image composition. The camera rotates according to the direction for rotating of the camera, until image composition quality of the preview image meets a preset condition, and then the camera stops rotating such that quality of a photographed image can be improved.

Figure 15:
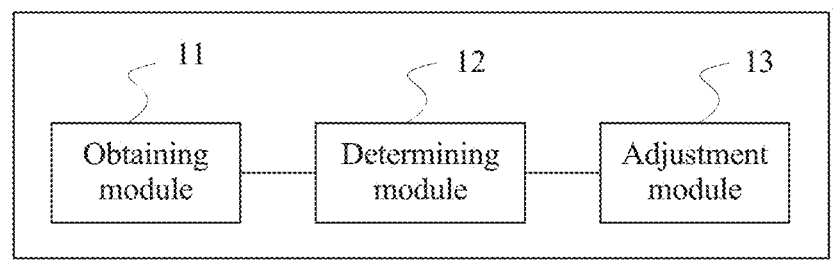
FIG. 15 is a schematic structural diagram of an electronic device for automatically adjusting a camera according to Embodiment 6 of the present disclosure.

FIG. 15 is a schematic structural diagram of an electronic device for automatically adjusting a camera according to Embodiment 6 of the present disclosure. As shown in FIG. 15, the electronic device provided in this embodiment includes an obtaining module 11, a determining module 12, and an adjustment module 13.

The obtaining module 11 is configured to obtain a parameter of a preview image in a shot of the camera, and the parameter of the preview image is any one of location information of a subject of the preview image, exposure quality information of the preview image, or image composition information of the preview image.

The determining module 12 is configured to determine a parameter for rotating of the camera according to the parameter that is of the preview image and that is obtained by the obtaining module 11, where the parameter for rotating of the camera includes a direction for rotating of the camera.

The adjustment module 13 is configured to adjust the camera according to the parameter for rotating of the camera determined by the determining module 12.

When the parameter of the preview image is location information of the preview image, the obtaining module 11 is further configured to obtain first location information of an initial location of the subject of the preview image, and obtain second location information of a location obtained after the subject of the preview image rotates after the electronic device rotates. Correspondingly, the determining module 12 is further configured to determine an offset direction of the preview image according to the first location information and the second location information, and the offset direction of the preview image is the direction for rotating of the camera. The adjustment module 13 is further configured to rotate the camera according to the direction for rotating of the camera, until the subject of the preview image returns to the initial location, and then stop rotating the camera.

Optionally, the electronic device further includes a detecting module (not shown) configured to detect whether the electronic device moves after the obtaining module 11 obtains the first location information of the initial location of the preview image. If the detecting module detects that the electronic device moves, the obtaining module 11 obtains the second location information of the location obtained after the preview image rotates.

When the parameter of the preview image is location information of the preview image, the parameter for rotating of the camera further includes an angle for rotating of the camera. The obtaining module 11 is further configured to obtain initial location information of an initial location of the subject of the preview image. Correspondingly, the determining module 12 is further configured to determine a rotation direction and a rotation angle that are of the electronic device after the electronic device rotates, and determine the angle for rotating and the direction for rotating that are of the camera according to the rotation direction and the rotation angle that are of the electronic device. The angle for rotating of the camera is the same as the rotation angle of the electronic device, and the direction for rotating of the camera is opposite to the rotation direction of the electronic device. The adjustment module 13 is further configured to rotate the camera according to the angle for rotating and the direction for rotating that are of the camera, until the subject of the preview image returns to the initial location.

When the parameter of the preview image is the exposure quality information of the preview image of the camera, the obtaining module 11 is further configured to obtain brightness distribution information of the preview image of the camera, and obtain the exposure quality information of the preview image according to the brightness distribution information of the preview image. The exposure quality information of the preview image includes overexposure, normal exposure, or underexposure. Correspondingly, the determining module 12 is further configured to determine, according to the exposure quality information of the preview image, whether the camera needs to be rotated, divide the preview image of the camera into N sub-images in a direction parallel to a rotation axis of the camera if the camera needs to be rotated, where N is greater than or equal to 2, and obtain brightness distribution information of the N sub-images, and determine the direction for rotating of the camera by comparing each piece of the brightness distribution information of the N sub-images with the brightness distribution information of the preview image. The adjustment module 13 is further configured to rotate the camera according to the direction for rotating of the camera, until exposure quality of the preview image meets a preset condition, and then stop rotating the camera.

That the determining module 12 determines the direction for rotating of the camera by comparing each piece of the brightness distribution information of the N sub-images with the brightness distribution information of the preview image includes comparing the brightness distribution information of the preview image with each piece of brightness distribution information of a first sub-image and a last sub-image that are in the N sub-images to determine a sub-image that affects the exposure quality of the preview image, where the first sub-image and the last sub-image are two sub-images that are of the preview image and that are respectively located at two ends, and determining that the direction for rotating of the camera is a direction in which the first sub-image is shifted out of the shot of the camera if the first sub-image is the sub-image that affects the exposure quality of the preview image, or determining that the direction for rotating of the camera is a direction in which the last sub-image is shifted out of the shot of the camera if the last sub-image is the sub-image that affects the exposure quality of the preview image.

That the adjustment module 13 rotates the camera according to the angle for rotating and the direction for rotating that are of the camera, until the subject of the preview image returns to the initial location, and then stops rotating the camera includes rotating the camera according to the direction for rotating of the camera, and obtaining the brightness distribution information of the preview image in a rotation process, determining, according to the brightness distribution information of the preview image, whether the exposure quality of the preview image meets the preset condition, and stop rotating the camera if the exposure quality of the preview image meets the preset condition, or if the exposure quality of the preview image does not meet the preset condition, continue rotating the camera according to the direction for rotating of the camera, until the exposure quality of the preview image meets the preset condition, and then stop rotating the camera.

That the determining module 12 determines, according to the brightness distribution information of the preview image, whether the exposure quality of the preview image meets the preset condition includes obtaining the exposure quality information of the preview image and a brightness distribution variance of the preview image according to the brightness distribution information of the preview image, and if the exposure quality information of the preview image is the normal exposure, determining that the exposure quality of the preview image meets the preset condition, or if the exposure quality information of the preview image is the underexposure or the overexposure, but the brightness distribution variance of the preview image is less than a preset brightness distribution variance threshold, determining that the exposure quality of the preview image meets the preset condition.

When the parameter of the preview image is the image composition information of the preview image of the camera, the obtaining module 11 is further configured to determine image composition of the subject of the preview image. Correspondingly, the determining module 12 is further configured to match the image composition of the subject of the preview image with multiple prestored image composition templates, to determine target image composition that matches the image composition of the subject of the preview image, and determine the direction for rotating of the camera according to a location deviation between the image composition of the subject of the preview image and the target image composition. The adjustment module 13 is further configured to rotate the camera according to the direction for rotating of the camera, until image composition quality of the preview image meets a preset condition, and then stop rotating the camera.

That the adjustment module 13 rotates the camera according to the direction for rotating of the camera, until image composition quality of the preview image meets a preset condition, and then stops rotating the camera includes rotating the camera according to the direction for rotating of the camera, obtaining the image composition of the subject of the preview image in a rotation process, and determining whether the location deviation between the image composition of the subject of the preview image and the target image composition is less than a preset deviation threshold, and if the location deviation between the image composition of the subject of the preview image and the target image composition is less than the deviation threshold, stop rotating the camera, or if the location deviation between the image composition of the subject of the preview image and the target image composition is not less than the preset deviation threshold, continue adjusting the camera according to the adjustment direction, until the location deviation between the image composition of the subject of the preview image and the target image composition is less than the deviation threshold, and then stop rotating the camera.

That the obtaining module 11 determines image composition of the subject of the preview image includes obtaining the image composition of the subject of the preview image in at least one manner of horizontal/vertical projection, edge detection, shape analysis, or color analysis.

The electronic device in this embodiment may be configured to implement the technical solutions in Embodiment 1 to Embodiment 5. Specific implementation manners and technical effects are similar, and details are not described herein again.

Figure 16:
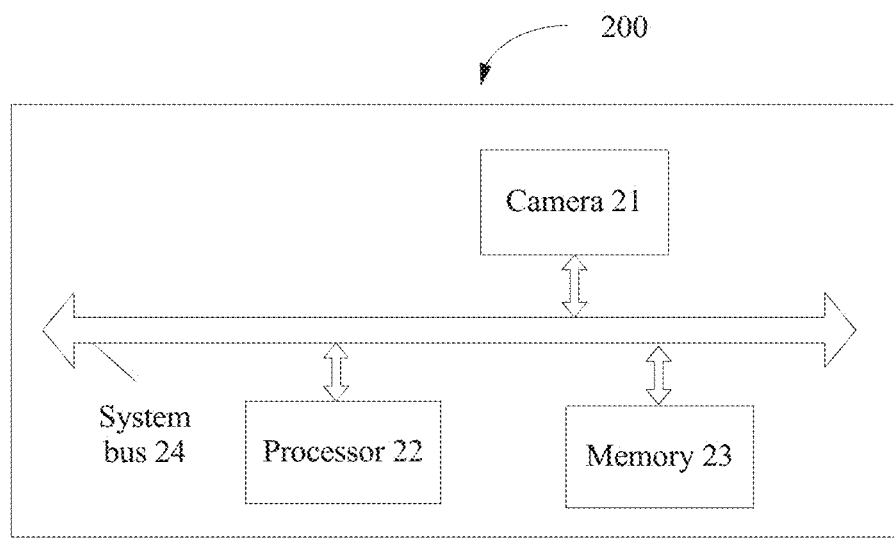
FIG. 16 is a schematic structural diagram of an electronic device according to Embodiment 7 of the present disclosure.

FIG. 16 is a schematic structural diagram of an electronic device 200 according to Embodiment 7 of the present disclosure. The electronic device 200 provided in this embodiment may be configured to implement the methods in Embodiment 1 to Embodiment 5 of the present disclosure. For ease of description, only a part related to this embodiment of the present disclosure is shown. For specific technical details that are not disclosed, refer to the descriptions in Embodiment 1 to Embodiment 5 of the methods in the present disclosure. As shown in FIG. 16, the electronic device 200 provided in this embodiment includes a camera 21, a processor 22, a memory 23, and a system bus 24. The memory 23 and the camera 21 are connected to the processor 22 using the system bus 24.

The camera 21 is configured to collect an external image and transmit the collected image to the processor 22.

The processor 22 is a control center of the electronic device 200, and is connected to various parts of the entire electronic device 200 using various interfaces and lines, and performs various functions of the electronic device 200 and/or processes data by running or executing a software program and/or a module stored in the memory 23 and by invoking data stored in the memory 23. The processor 22 may include an integrated circuit (IC), for example, may include a singly-encapsulated IC or may include multiple connected encapsulated ICs with a same function or different functions. For example, the processor 22 may include only a CPU, or may be a combination of a graphical processing unit (GPU), a digital signal processor (DSP), and a control chip (for example, a baseband chip) in a communications unit.

The memory 23 may be configured to store the software program and the module, and the processor 22 executes various functional applications of the electronic device 200 and implements data processing by running the software program and the module that are stored in the memory 23. The memory 23 mainly includes a program storage area and a data storage area. The program storage area may store an operating system, and an application program, such as a sound playing program or an image playing program, that is required by at least one function. The data storage area may store data (such as audio data or a phone book) that is created according to use of the electronic device 200, and the like. In a specific implementation manner of the present disclosure, the memory 23 may include a volatile memory, a nonvolatile random access memory (NVRAM), a phase change random access memory (PRAM), or a magnetoresistive random access memory (MRAM), or may include a nonvolatile memory, such as at least one magnetic disk storage component, an electrically erasable programmable read-only memory (EEPROM), or a flash memory component, such as a NOR flash memory or a NAND flash memory. The nonvolatile memory stores an operating system and an application program that are executed by the processor 22. The processor 22 loads, from the nonvolatile memory, a running program and data to the memory 23, and stores digital content to a mass storage apparatus. The operating system includes various components and/or drives that are used to control and manage a conventional system task, for example, memory management, storage device control, or power management, and facilitate communication between various software and hardware. In this implementation manner of the present disclosure, the operating system may be an ANDROID operating system of GOOGLE Incorporation, an IOS operating system developed by APPLE Incorporation, a WINDOWS operating system developed by MICROSOFT Corporation, or the like, or may be an embedded operating system such as VXWORKS. The application program includes any application installed on the electronic device, and includes but is not limited to a browser, an email, an instant messaging service, word processing, a virtual keyboard, a window widget (Widget), encryption, digital copyright management, voice recognition, voice duplication, positioning (such as a function provided by the Global Positioning System), music play, or the like.

Persons skilled in the art may understand that a structure of the electronic device 200 shown in FIG. 16 constitutes no limitation on an electron, and instead the electronic device 200 may include components more or fewer than those shown in the FIG. 16, or a combination of some components, or different component arrangements. Although not shown in the FIG. 16, the electronic device 200 may further include components such as a touchscreen, a power supply, a radio frequency (RF) circuit, a WI-FI module, an audio frequency circuit, and a sensor, which are not described herein.

In this embodiment, the processor 22 is further configured to execute the operations of obtaining a parameter of a preview image in a shot of the camera 21, where the parameter of the preview image is any one of location information of a subject of the preview image, exposure quality information of the preview image, or image composition information of the preview image, determining a parameter for rotating of the camera 21 according to the parameter of the preview image, where the parameter for rotating of the camera 21 includes a direction for rotating of the camera 21, and adjusting the camera 21 according to the parameter for rotating of the camera 21.

When the parameter of the preview image is location information of the preview image, that the processor 22 obtains a parameter of a preview image in a shot of the camera 21 includes obtaining first location information of an initial location of the subject of the preview image, and after the electronic device 200 rotates, obtaining second location information of a location obtained after the subject of the preview image rotates. Determining a parameter for rotating of the camera 21 according to the parameter of the preview image includes determining an offset direction of the preview image according to the first location information and the second location information, and the offset direction of the preview image is the direction for rotating of the camera 21. Adjusting the camera 21 according to the parameter for rotating of the camera 21 includes rotating the camera 21 according to the direction for rotating of the camera 21, until the subject of the preview image returns to the initial location, and then stop rotating the camera 21.

Optionally, after obtaining first location information of an initial location of the preview image, the processor 22 is further configured to detect whether the electronic device 200 moves, and obtain the second location information of the location obtained after the preview image rotates if it is detected that the electronic device 200 moves.

When the parameter of the preview image is location information of the preview image, the parameter for rotating of the camera 21 further includes an angle for rotating of the camera 21. That the processor 22 obtains a parameter of a preview image in a shot of the camera 21 includes obtaining initial location information of an initial location of the subject of the preview image.

Determining a parameter for rotating of the camera 21 according to the parameter of the preview image includes determining a rotation direction and a rotation angle that are of the electronic device 200 after the electronic device 200 rotates, and determining the angle for rotating and the direction for rotating of the camera 21 according to the rotation direction and the rotation angle that are of the electronic device 200. The angle for rotating of the camera 21 is the same as the rotation angle of the electronic device 200, and the direction for rotating of the camera 21 is opposite to the rotation direction of the electronic device 200. Adjusting the camera according to the parameter for rotating of the camera 21 includes rotating the camera 21 according to the angle for rotating and the direction for rotating that are of the camera 21, until the subject of the preview image returns to the initial location.

When the parameter of the preview image is the exposure quality information of the preview image of the camera 21, that the processor 22 obtains a parameter of a preview image in a shot of the camera 21 includes obtaining brightness distribution information of the preview image of the camera 21, and obtaining the exposure quality information of the preview image according to the brightness distribution information of the preview image. The exposure quality information of the preview image includes overexposure, normal exposure, or underexposure. Determining a parameter for rotating of the camera 21 according to the parameter of the preview image includes determining, according to the exposure quality information of the preview image, whether the camera 21 needs to be rotated, dividing the preview image into N sub-images in a direction parallel to a rotation axis of the camera 21, where N is greater than or equal to 2, and obtaining brightness distribution information of the N sub-images if the camera 21 needs to be rotated, and determining the direction for rotating of the camera 21 by comparing each piece of the brightness distribution information of the N sub-images with the brightness distribution information of the preview image. Adjusting the camera 21 according to the parameter for rotating of the camera 21 includes rotating the camera 21 according to the direction for rotating of the camera 21, until exposure quality of the preview image meets a preset condition, and then stop rotating the camera 21.

Determining the direction for rotating of the camera 21 by comparing each piece of the brightness distribution information of the N sub-images with the brightness distribution information of the preview image includes comparing the brightness distribution information of the preview image with each piece of brightness distribution information of a first sub-image and a last sub-image that are in the N sub-images to determine a sub-image that affects the exposure quality of the preview image, where the first sub-image and the last sub-image are two sub-images that are of the preview image and that are respectively located at two ends, and determining that the direction for rotating of the camera 21 is a direction in which the first sub-image is shifted out of the shot of the camera 21 if the first sub-image is the sub-image that affects the exposure quality of the preview image, or determining that the direction for rotating of the camera 21 is a direction in which the last sub-image is shifted out of the shot of the camera 21 if the last sub-image is the sub-image that affects the exposure quality of the preview image.

Rotating the camera 21 according to the direction for rotating of the camera 21, until exposure quality of the preview image meets a condition, and then stop rotating the camera 21 includes rotating the camera 21 according to the direction for rotating of the camera 21, and obtaining the brightness distribution information of the preview image in a rotation process, determining, according to the brightness distribution information of the preview image, whether the exposure quality of the preview image meets the preset condition, and stop rotating the camera 21 if the exposure quality of the preview image meets the preset condition, or continue rotating the camera 21 according to the direction for rotating of the camera 21 if the exposure quality of the preview image does not meet the preset condition, until the exposure quality of the preview image meets the preset condition, and then stop rotating the camera 21.

Determining, according to the brightness distribution information of the preview image, whether the exposure quality of the preview image meets the preset condition includes obtaining the exposure quality information of the preview image and a brightness distribution variance of the preview image according to the brightness distribution information of the preview image, and determining that the exposure quality of the preview image meets the preset condition if the exposure quality information of the preview image is the normal exposure, or determining that the exposure quality of the preview image meets the preset condition if the exposure quality information of the preview image is the underexposure or the overexposure, but the brightness distribution variance of the preview image is less than a preset brightness distribution variance threshold.

When the parameter of the preview image is the image composition information of the preview image of the camera 21, that the processor 22 obtains a parameter of a preview image in a shot of the camera includes determining image composition of the subject of the preview image. Determining a parameter for rotating of the camera 21 according to the parameter of the preview image includes matching the image composition of the subject of the preview image with multiple prestored image composition templates to determine target image composition that matches the image composition of the subject of the preview image, and determining the direction for rotating of the camera 21 according to a location deviation between the image composition of the subject of the preview image and the target image composition. Adjusting the camera 21 according to the parameter for rotating of the camera 21 includes rotating the camera 21 according to the direction for rotating of the camera 21, until image composition quality of the preview image meets a preset condition, and then stop rotating the camera 21.

Rotating the camera 21 according to the direction for rotating of the camera 21, until image composition quality of the preview image meets a preset condition, and then stop rotating the camera 21 includes rotating the camera 21 according to the direction for rotating of the camera 21, obtaining the image composition of the subject of the preview image in a rotation process, and determining whether the location deviation between the image composition of the subject of the preview image and the target image composition is less than a preset deviation threshold, and stop rotating the camera 21 if the location deviation between the image composition of the subject of the preview image and the target image composition is less than the deviation threshold, or continue adjusting the camera 21 according to the adjustment direction if the location deviation between the image composition of the subject of the preview image and the target image composition is not less than the preset deviation threshold, until the location deviation between the image composition of the subject of the preview image and the target image composition is less than the deviation threshold, and then stop rotating the camera 21.

Determining image composition of the subject of the preview image includes obtaining the image composition of the subject of the preview image in at least one manner of horizontal/vertical projection, edge detection, shape analysis, or color analysis.

The electronic device 200 in this embodiment may be configured to implement the technical solutions in Embodiment 1 to Embodiment 5. Specific implementation manners and technical effects are similar, and details are not described herein again.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An automatic camera adjustment method for a camera, applied to an electronic device comprising:
    obtaining, by the electronic device, exposure quality information of a preview image in a shot of the camera by:
        obtaining brightness distribution information of the preview image; and
        obtaining the exposure quality information of the preview image according to the brightness distribution information of the preview image;
    determining, by the electronic device, a parameter for rotating the camera including a direction based on the exposure quality information, by:
        determining, based on the exposure quality information, whether the camera needs to be rotated;
        dividing the preview image into a plurality of sub-images in a direction parallel to a rotational axis of the camera when the camera needs to be rotated;
        obtaining brightness distribution information of each of the plurality of sub-images; and
        determining the direction by comparing the brightness distribution information for the each of the plurality of sub-images with the brightness distribution information of the preview image; and
    adjusting, by the electronic device, the camera based on the direction for rotating the camera by:
        rotating the camera based on the direction; and
        stop rotating the camera when exposure quality of the preview image meets a preset condition.

2. The automatic camera adjustment method of claim 1, wherein determining the direction for rotating the camera comprises:
    comparing, by the electronic device, the brightness distribution information of the preview image with each piece of brightness distribution information of a first sub-image and a last sub-image of the plurality of sub-images to determine a sub-image that affects the exposure quality of the preview image;
    determining, by the electronic device, that the direction for rotating the camera is a direction in which the first sub-image is shifted out of the shot of the camera when the first sub-image is the sub-image that affects the exposure quality of the preview image; and
    determining, by the electronic device, that the direction for rotating the camera is a direction in which the last sub-image is shifted out of the shot of the camera when the last sub-image is the sub-image that affects the exposure quality of the preview image.

3. The automatic camera adjustment method of claim 1, wherein rotating the camera, and stop rotating the camera comprises:
    rotating, by the electronic device, the camera according to the direction for rotating the camera;
    obtaining, by the electronic device, the brightness distribution information of the preview image in a rotation process;
    determining, by the electronic device according to the brightness distribution information of the preview image, whether the exposure quality of the preview image meets the preset condition; and
    stop rotating, by the electronic device, the camera when the exposure quality of the preview image meets the preset condition.

4. The automatic camera adjustment method of claim 3, wherein determining whether the exposure quality of the preview image meets the preset condition comprises:
    obtaining, by the electronic device, the exposure quality information of the preview image and a brightness distribution variance of the preview image according to the brightness distribution information of the preview image;
    determining, by the electronic device, that the exposure quality of the preview image meets the preset condition when the exposure quality information of the preview image is a normal exposure; and
    determining, by the electronic device, that the exposure quality of the preview image meets the preset condition, but the brightness distribution variance of the preview image is less than a preset brightness distribution variance threshold.

5. The automatic camera adjustment method of claim 1, wherein the exposure quality information comprises at least one of:
    an overexposure;
    a normal exposure; or
    an underexposure.

6. The automatic camera adjustment method of claim 5, wherein the direction comprises at least one of:
    a rotation direction; or
    a rotation angle.

7. The automatic camera adjustment method of claim 6, wherein the rotation direction for rotating of the camera is opposite to the rotation direction of the electronic device.

8. The automatic camera adjustment method of claim 6, wherein the rotation angle comprises an angle for rotating the camera that is the rotation angle of the electronic device.

9. An electronic device, comprising:
    a camera;
    a processor; and
    a memory coupled to the camera and the processor, the memory configured to store computer executable instructions that, when executed, cause the processor to:
        obtain exposure quality information of a preview image in a shot of the camera by:
            obtaining brightness distribution information of the preview image; and
            obtaining the exposure quality information of the preview image based on the brightness distribution information of the preview image; and
        determine a direction for rotating the camera according to the exposure quality information of the preview image by:
            determining, based on the exposure quality information, whether the camera needs to be rotated;
            dividing the preview image of the camera into a plurality of sub-images in a direction parallel to a rotational axis of the camera when the camera needs to be rotated;
            obtaining brightness distribution information of each of the plurality of sub-images;
            determining the direction by comparing the brightness distribution information; and
        adjust the camera according to the exposure quality information for rotating the camera by:
            rotating the camera based on the direction; and
            stop rotating the camera when exposure quality of the preview image meets a preset condition.

10. The electronic device of claim 9, wherein the memory stores further computer executable instructions that, when executed, cause the processor to:
  compare the brightness distribution information of the preview image with each piece of brightness distribution information of a first sub-image and a last sub-image in the plurality of sub-images to determine a sub-image that affects exposure quality of the preview image;
  determine that the direction for rotating the camera is a direction in which the first sub-image is shifted out of the shot of the camera when the first sub-image is the sub-image that affects the exposure quality of the preview image; and
  determine that the direction for rotating the camera is a direction in which the last sub-image is shifted out of the shot of the camera when the last sub-image is the sub-image that affects the exposure quality of the preview image.

11. The electronic device of claim 9, wherein the memory stores further computer executable instructions that, when executed, cause the processor to:
  rotate the camera according to the direction for rotating the camera;
  obtain the brightness distribution information of the preview image in a rotation process;
  determine, according to the brightness distribution information of the preview image, whether an exposure quality of the preview image meets the preset condition; and
  stop rotating the camera when the exposure quality of the preview image meets the preset condition.

12. The electronic device of claim 11, wherein the memory stores further computer executable instructions that, when executed, cause the processor to:
  obtain the exposure quality information of the preview image and a brightness distribution variance of the preview image according to the brightness distribution information of the preview image;
  determine that the exposure quality of the preview image meets the preset condition when the exposure quality information of the preview image is a normal exposure; and
  determine that the exposure quality of the preview image meets the preset condition, but the brightness distribution variance of the preview image is less than a preset brightness distribution variance threshold.

13. The electronic device of claim 9, wherein the exposure quality information comprises at least one of:
  an overexposure;
  a normal exposure; or
  an underexposure.

14. The electronic device of claim 13, wherein the direction comprises at least one of:
  a rotation direction; or
  a rotation angle.

15. The electronic device of claim 14, wherein the rotation direction for rotating of the camera is opposite to the rotation direction of the electronic device.

16. The electronic device of claim 14, wherein the rotation angle comprises an angle for rotating the camera that is the rotation angle of the electronic device.

17. A non-transitory computer readable storage medium storing computer executable instructions that, when executed, cause a processor to:
  obtain exposure quality information of a preview image in a shot of a camera by:
    obtaining brightness distribution information of the preview image; and
    obtaining the exposure quality information of the preview image based on the brightness distribution information of the preview image; and
  determine a direction for rotating the camera according to the exposure quality information of the preview image by:
    determining, based on the exposure quality information, whether the camera needs to be rotated;
    dividing the preview image of the camera into a plurality of sub-images in a direction parallel to a rotational axis of the camera when the camera needs to be rotated;
    obtaining brightness distribution information of each of the plurality of sub-images;
    determining the direction by comparing the brightness distribution information; and
  adjust the camera according to the exposure quality information for rotating the camera by:
    rotating the camera based on the direction; and
    stop rotating the camera when exposure quality of the preview image meets a preset condition.

18. The non-transitory computer readable storage medium of claim 17, including further computer executable instructions that, when executed, cause the processor to:
  compare the brightness distribution information of the preview image with each piece of brightness distribution information of a first sub-image and a last sub-image in the plurality of sub-images to determine a sub-image that affects exposure quality of the preview image;
  determine that the direction for rotating the camera is a direction in which the first sub-image is shifted out of the shot of the camera when the first sub-image is the sub-image that affects the exposure quality of the preview image; and
  determine that the direction for rotating the camera is a direction in which the last sub-image is shifted out of the shot of the camera when the last sub-image is the sub-image that affects the exposure quality of the preview image.

19. The non-transitory computer readable storage medium of claim 17, including further computer executable instructions that, when executed, cause the processor to:
  rotate the camera according to the direction for rotating the camera;
  obtain the brightness distribution information of the preview image in a rotation process;
  determine, according to the brightness distribution information of the preview image, whether an exposure quality of the preview image meets the preset condition; and
  stop rotating the camera when the exposure quality of the preview image meets the preset condition.

20. The non-transitory computer readable storage medium of claim 19, wherein the memory stores further computer executable instructions that, when executed, cause the processor to:
  obtain the exposure quality information of the preview image and a brightness distribution variance of the preview image according to the brightness distribution information of the preview image;
  determine that the exposure quality of the preview image meets the preset condition when the exposure quality information of the preview image is a normal exposure; and determine that the exposure quality of the preview image meets the preset condition when the exposure quality information of the preview image is an underexposure or an overexposure, but that the brightness distribution variance of the preview image is less than a preset brightness distribution variance threshold.

* * * * *